US008647418B2

(12) United States Patent
Furuyama et al.

(10) Patent No.: US 8,647,418 B2
(45) Date of Patent: Feb. 11, 2014

(54) ADSORPTION TOWER OF DRY EXHAUST GAS TREATMENT DEVICE

(75) Inventors: Kuninori Furuyama, Tokyo (JP); Masahiro Miya, Tokyo (JP); Ryo Suzuki, Tokyo (JP)

(73) Assignee: J-POWER EnTech, Inc., Tokyo (JP)

( * ) Notice: Subject to any disclaimer, the term of this patent is extended or adjusted under 35 U.S.C. 154(b) by 238 days.

(21) Appl. No.: 13/254,496

(22) PCT Filed: Mar. 2, 2009

(86) PCT No.: PCT/JP2009/053826
§ 371 (c)(1),
(2), (4) Date: Oct. 3, 2011

(87) PCT Pub. No.: WO2010/100708
PCT Pub. Date: Oct. 9, 2010

(65) Prior Publication Data
US 2012/0058017 A1     Mar. 8, 2012

(51) Int. Cl.
*B01D 53/08* (2006.01)
*B01J 8/12* (2006.01)

(52) U.S. Cl.
USPC .................................. 96/131; 96/150; 96/152

(58) Field of Classification Search
USPC .................. 96/121, 123, 131, 133, 150, 152; 95/107, 110–112; 722/170; 55/484, 55/518
See application file for complete search history.

(56) References Cited

U.S. PATENT DOCUMENTS

| | | | | |
|---|---|---|---|---|
| 3,815,335 A | * | 6/1974 | Barnebey | 96/130 |
| 3,964,890 A | * | 6/1976 | Bonn | 55/479 |
| 4,133,659 A | | 1/1979 | Beckman | |
| 6,086,659 A | * | 7/2000 | Tentarelli | 96/131 |

FOREIGN PATENT DOCUMENTS

| | | |
|---|---|---|
| DE | 2802574 A1 | 7/1978 |
| GB | 1566226 A | 4/1989 |
| JP | 53-093177 A | 8/1978 |
| JP | 55-094620 A | 7/1980 |
| JP | 58-189024 | * 11/1983 |
| JP | 11-009944 A | 1/1999 |
| JP | 2001-276559 A | 10/2001 |

OTHER PUBLICATIONS

Translation of International Search Report Dated Apr. 13, 2009.
Concise Statement of Relevance for Japanese Utility Model Nos. 60-43638, 53-15772 and 62-181529.

* cited by examiner

*Primary Examiner* — Frank Lawrence, Jr.
(74) *Attorney, Agent, or Firm* — Norris McLaughlin & Marcus P.A.

(57) ABSTRACT

An exhaust gas dry treatment device comprises an adsorption tower having: a box-shaped tower body; a plurality of reaction chambers have moving beds therein; a plurality of vertical partition plates which sequentially close between the end parts of the plurality of reaction chambers and between the end parts of the reaction chambers and the inner wall of the tower; an exhaust gas supply port allowing the inside of an inlet side wind box space which is formed in the tower body between the front tower wall and the reaction chamber end part to communicate with the inside of an exhaust gas supply duct; and an exhaust gas discharge port allowing the inside of an outlet side wind box space which is formed in the tower body between the rear tower wall and the reaction chamber end part to communicate with the inside of an exhaust gas discharge duct.

4 Claims, 25 Drawing Sheets

Fig. 4
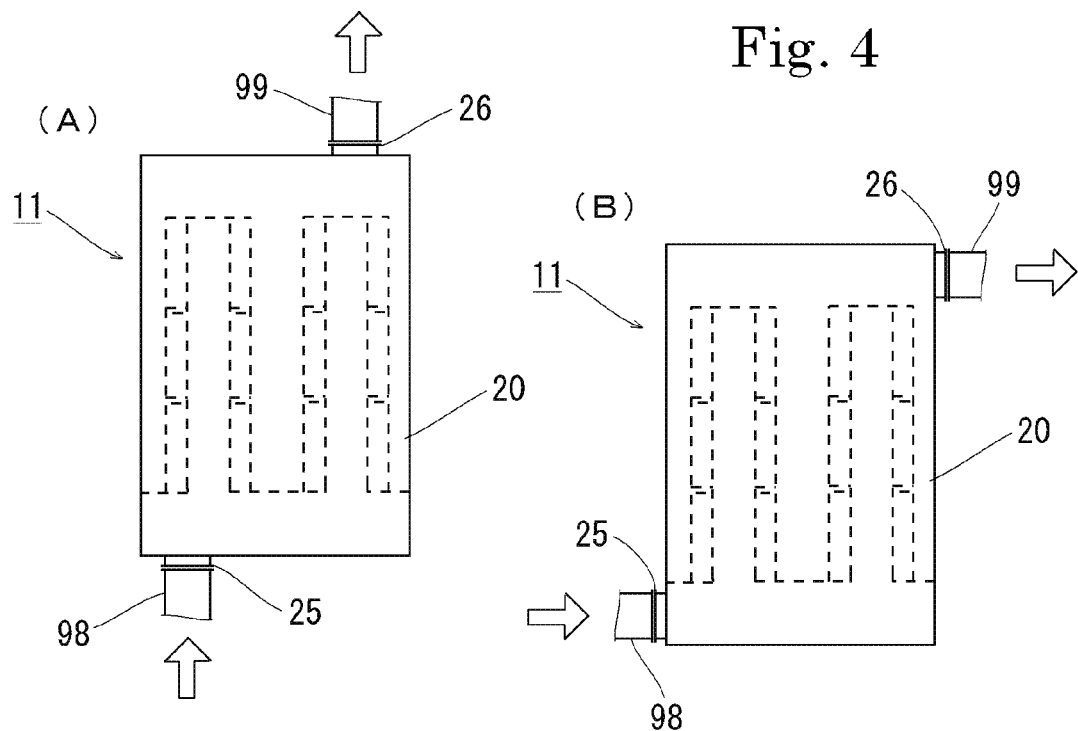
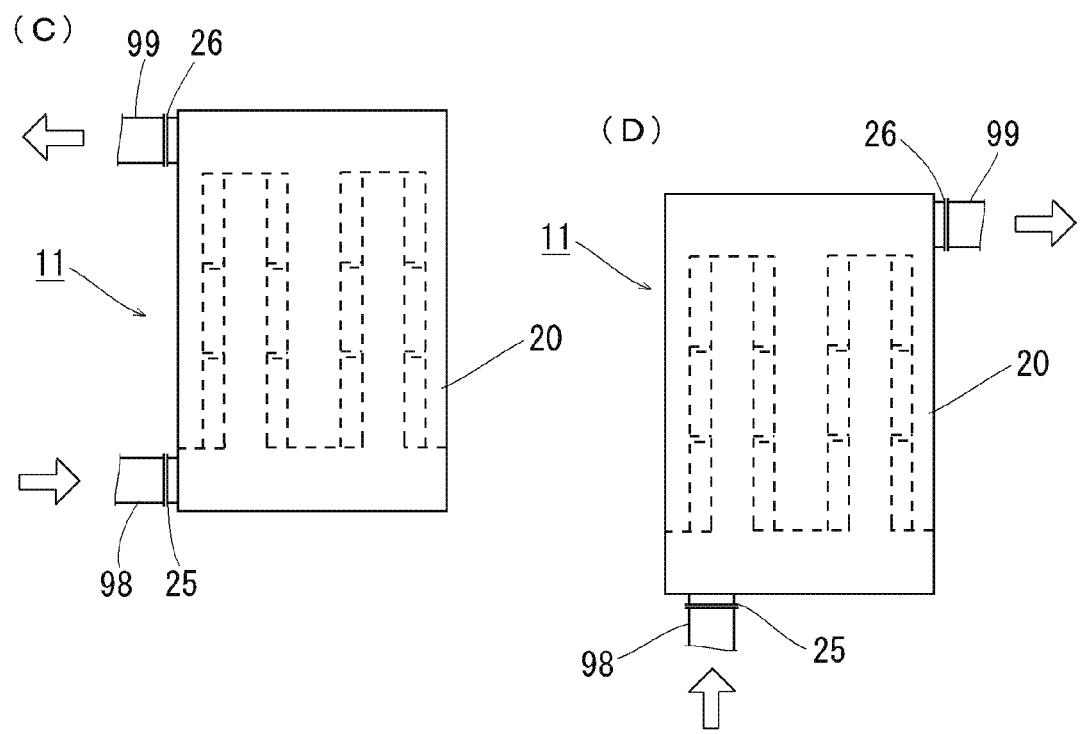

PRIOR ART

PRIOR ART

ADSORPTION TOWER OF DRY EXHAUST GAS TREATMENT DEVICE

This application is a 371 application of PCT/JP2009/053826 filed Mar. 2, 2009.

TECHNICAL FIELD

The present invention relates to an adsorption tower used in an exhaust gas dry treatment device using a granular adsorbent. Inside the adsorption tower, there are formed moving beds in which an adsorbent flows down from the upper side toward the lower side, for adsorption and removal of the harmful components contained in an exhaust gas.

BACKGROUNDS ART

Exhaust gas dry treatment devices having an adsorption tower filled with a granular adsorbent are in use in order to remove the sulfur oxides, nitrogen oxides, etc. contained in an exhaust gas such as boiler exhaust gas, sintering furnace exhaust gas or the like. The adsorbent includes, for example, a carbonaceous adsorbent, an alumina-based adsorbent and a silica-based adsorbent. The carbonaceous adsorbent is capable of treating an exhaust gas at relatively low temperatures and removing various harmful substances simultaneously; therefore, it is superior to other adsorbents.

The carbonaceous adsorbent includes, for example, activated carbon and activated coke, and a pelletized adsorbent of about 0.5 to 4 cm is preferred particularly. These are known adsorbents. Patent Literature 1 shows the outline of an exhaust gas treatment device using a carbonaceous adsorbent.

This exhaust gas treatment device has, as shown in FIG. 25, an adsorption tower 10, a regeneration tower 90, a sieve 91, an adsorbent storage tank 92, a by-product recovery apparatus 93, etc. Inside the adsorption tower 10 are formed moving beds filled with a granular adsorbent. An exhaust gas of 100 to 200° C. is contacted with the adsorbent in the moving beds, whereby the harmful components contained in the exhaust gas can be removed.

Ammonia, urea, etc. are added into an exhaust gas; the mixture is sent to the adsorption tower; thereby, the nitrogen oxides in the exhaust gas are decomposed into nitrogen and water by the catalytic action of the adsorbent. Other harmful components are removed mainly by the adsorptivity of the adsorbent.

The regeneration tower 90 is an apparatus for regeneration of adsorbent. The adsorbent adsorbs harmful components in the treatment of exhaust gas; dust, etc. adhere onto the surfaces of the adsorbent; the adsorptivity of the adsorbent is reduced gradually. The adsorbent reduced in the adsorptivity is withdrawn from the adsorption tower 10 and carried to the regeneration tower 90 by a conveyor line 94. Inside the regeneration tower 90, the adsorbent is heated to a high temperature in a nearly oxygen-free atmosphere. Thereby, the harmful components are desorbed and the adsorbent is regenerated. The regenerated adsorbent is cooled and returned back to the adsorption tower 10 by a conveyor line 95.

The sieve 91 is for removal of fine powder from adsorbent. The fine powder includes, for example, the dust removed from the exhaust gas in the adsorption tower 10 and the adsorbent which was powdered by abrasion during the circulation between the adsorption tower 10 and the regeneration tower 90. The fine powder removed by the sieve 91 is stored in a hopper 96 and discharged outside the system.

The adsorbent storage tank 92 is a storage tank of fresh adsorbent. The adsorbent is partially powdered and discharged outside the system and is partially consumed by the reaction; therefore, a fresh portion of adsorbent need be supplied incessantly. The exhaust gas containing harmful components is introduced into the adsorption tower 10 via an exhaust gas supply duct 98. The treated exhaust gas is sent to a chimney 97 via an exhaust gas discharge duct 99 and then discharged into the air. The harmful components composed mainly of sulfur oxides, discharged from the regeneration tower 10 are treated in the by-product recovery apparatus 93, and sulfuric acid, for example, is produced.

The Patent Literature 1 gives a detailed description on the adsorption tower 10. Citing the description, the adsorption tower 10 is explained referring to FIGS. 20 to 24. The adsorption tower 10 has a boxed-shaped tower body 20, two exhaust gas supply ports 25a and 25b formed in the front tower wall 21 of the tower body 20, and three exhaust gas discharge ports 26a, 26b and 26c formed in the rear tower wall 22 facing the front tower wall 21 (FIGS. 20 and 22).

Inside the tower body 20 are provided a plurality of reaction chambers 51, 52, 53 and 54 which form moving beds therein (FIGS. 21 and 22). The reaction chambers 51 to 54 are each provided vertically and nearly parallel from the front tower wall 21 toward the rear tower wall 22 facing the front tower wall 21 and from the tower top wall 27 to the tower bottom wall 28.

The reaction chambers 51 to 54 are each constituted by three units 30, 30 and 30, as shown in FIG. 22. As shown in FIG. 23, each unit 30 is formed in a flat box shape and has a gas-flowing section 38 through which an exhaust gas flows in a horizontal direction (an arrow X direction). Above the gas-flowing section 38 is formed an adsorbent supply section 37, and an adsorbent discharge section 39 is formed below the gas-flowing section 38. The gas-flowing section 38 has four sides; opposing two wide sides are formed as a gas-incoming surface 31 and a gas-leaving surface 32; and other two narrow sides 33 and 34 are closed.

In the unit 30, the supply section 37 has at least one supply port 35 (2 ports in the Fig.) and the discharge section 39 has at least one discharge port 36 (2 ports in the Fig.). An adsorbent is continuously fed from the supply port 35 and is discharged continuously from the discharge port 36, whereby a moving bed of adsorbent is formed in the unit. In the moving bed, the adsorbent at the gas-incoming surface 31 side adsorbs harmful substances in a larger amount than the adsorbent at the gas-leaving surface 32 side. As a result, the adsorptivity of the adsorbent falls sharply. Hence, the flowing-down speed of adsorbent at the gas-incoming surface 31 side is made higher than that at the gas-leaving surface 32 side, in many cases.

The gas-incoming surface 31 and the gas-leaving surface 32 are formed by a louver, a perforated plate, or the like. Owing to such a structure, the adsorbent flowing down in the unit 30 can be kept in the unit 30 and the passage of exhaust gas through unit 30 is made possible. In one case, the area of gas-incoming surface 31 (gas-leaving surface 32) in one unit 30 is about 100 m². One unit 30 can treat an exhaust gas by about several tens of thousands Nm³/h.

The reaction chambers 51 to 54 each comprise three connected units 30. A gas-incoming surface 31 and a gas-leaving surface 32 are formed at the two sides of three units, facing each other in a direction intersecting at right angles with the connecting direction of three units 30. Each interface between two adjacent units 30 and each interface between the end unit 30 and the tower inner wall are completely closed for prevention of exhaust gas passage.

The reaction chambers 51 and 52 are arranged in such a way that the respective gas-incoming surfaces 31 face each other, and the space q between the two reaction chambers form a gas-incoming passage communicating with an exhaust gas supply port 25a. The reaction chambers 53 and 54 are arranged in such a way that the respective gas-incoming surfaces 31 face each other, and the space r between the two reaction chambers form a gas-incoming passage communicating with an exhaust gas supply port 25b.

The space s between the reaction chamber 51 and the side tower wall 23 communicates with an exhaust gas discharge port 26a and forms a gas-leaving passage of the exhaust gas which has passed through the reaction chamber 51. The space t between the reaction chamber 52 and the reaction chamber 53 communicates with an exhaust gas discharge port 26b and forms a gas-leaving passage of the exhaust gases which have passed through the reaction chambers 52 and 53. The space u between the reaction chamber 54 and the side tower wall 24 communicates with an exhaust gas discharge port 26c and forms a gas-leaving passage of the gas which has passed the reaction chamber 54.

The adsorption tower 10 has a very wide area for gas flow and can remove the harmful substances contained in an exhaust gas, by the contact of exhaust gas with adsorbent. The adsorbent flows down continuously from each adsorbent supply port 35 toward each adsorbent discharge port 36; a fresh adsorbent is incessantly introduced into the adsorption tower 10; therefore, the adsorption tower 10 can show a constant treatability in its continuous operation.

The adsorption tower 10 has a plurality of exhaust gas supply ports 25a and 25b connected to an exhaust gas supply duct 98. The adsorption tower 10 also has a plurality of exhaust gas discharge ports 26a, 26b and 26c connected to an exhaust gas discharge duct 99. Moreover, the adsorption tower 10 has very large duct sections 45a and 45b of complicated shape between the exhaust gas supply ports 25a and 25b and the front tower wall 21, and has similar duct sections 46a, 46b and 46c between the exhaust gas discharge ports 26a, 26b and 26c and the rear tower wall 22.

These duct sections 45a, 45b, 46a, 46b and 46c need to have each a small sectional shape so as to fit the shape of the duct 98 or 99, at their sides connected to the duct 98 and 99. The duct sections need to have, at their sides connected to the tower body 20, a slender rectangular sectional shape so as to fit the sectional shapes of spaces q and r (gas-incoming passages) and spaces s, t and u (gas-leaving passages). Consequently, the duct sections 45a, 45b, 46a, 46b and 46c have complicated sectional shapes which change sharply, requiring a large ground area.

In FIG. 24 is shown a plan view of arrangement of adsorption tower 10 including an exhaust gas supply duct 98 and an exhaust gas discharge duct 99. As seen in this view, there is a case that the area for arranging the ducts 98 and 99 and duct sections 45a, 45b, 46a, 46b and 46c is larger than the area of tower body 20.

Further, the exhaust gas supply duct 98 and the exhaust gas discharge duct 99 need to be arranged respectively in parallel to the front tower wall 21 and the rear tower wall 22, and no other arrangement is allowed. Since the arrangement of the two ducts 98 and 99 is thus restricted strictly, the arrangement of the adsorption tower 10 undergoes a large restriction.

As described above, the conventional adsorption tower 10 requires duct sections communicating with exhaust gas supply ports and exhaust gas discharge ports and has a complicated and large shape. The adsorption tower 10 needs a large arrangement space and undergoes a large spatial restriction in connection with ducts. As a result, the conventional adsorption tower 10 is complicated in designing, manufacturing and construction, making high the manufacturing cost. Further, in the operation thereof, the inspection, maintenance, cleaning, etc. are complicated, making high the costs thereof.

Patent Literature 1: JP-A-1999-9944

DISCLOSURE OF THE INVENTION

Technical Problem

The aim of the present invention is to provide an adsorption tower having a simple and compact duct structure at the connection portions between the exhaust gas ducts and the tower. Also, the aim of the present invention is to provide an adsorption tower in which the positions and directions of fitting of exhaust gas supply port and exhaust gas discharge port can be selected freely in some degree. Further, the aim of the present invention is to provide an adsorption tower lower in construction cost and smaller in arrangement space than in conventional adsorption towers. Furthermore, the aim of the present invention is to provide an economical adsorption tower which enables, in the operation, simple implementations of inspection, maintenance, cleaning, etc.

Technical Solution

The present invention is as described below.

[1] An adsorption tower used in an exhaust gas dry treatment device having an adsorption tower for adsorbing and removing the harmful components contained in an exhaust gas, using a granular adsorbent, which adsorbent tower comprises a box-shaped tower body, a plurality of reaction chambers which are vertically formed in the tower body so as to extend from a tower top wall to a tower bottom wall and from a front tower wall side toward a rear tower wall side while being separated from the front tower wall and the rear tower wall by predetermined distances, and which have moving beds therein, a plurality of vertical partition plates installed so as to sequentially close the openings between the ends of reaction chambers and the openings between the ends of reaction chambers and a tower inner wall, an exhaust gas supply port allowing the inside of an inlet side wind box space which is formed in the tower body between the front tower wall and the ends of the reaction chambers, to communicate with the inside of an exhaust gas supply duct, and an exhaust gas discharge port allowing the inside of an outlet side wind box space which is formed in the tower body between the rear tower wall and the ends of the reaction chambers, to communicate with the inside of an exhaust gas discharge duct.

[2] An adsorption tower used in an exhaust gas dry treatment device having an adsorption tower for adsorbing and removing the harmful components contained in an exhaust gas, using a granular adsorbent, which adsorbent tower comprises a box-shaped tower body, a horizontal partition plate of predetermined length formed in the tower body from a front tower wall toward a rear tower wall over the total width of the front tower wall, a plurality of reaction chambers which are vertically formed between the horizontal partition plate and the rear tower wall from a tower top wall to a tower bottom wall and which have moving beds therein, lower partition plates formed in a lower tower body below the horizontal partition plate so as to alternately close the openings between the ends of reaction chambers and, as necessary, the openings between the ends of reaction chambers and a tower inner wall, upper partition plates formed in an upper tower body above the horizontal partition plate so as to alternately close the openings between the ends of openings chambers and, as necessary, the openings between the ends of reaction chambers and the tower inner wall, wherein no upper partition plate being installed above the lower partition plates and no lower partition plate being installed below the upper partition plates, an exhaust gas supply port allowing the inside of an inlet side wind box space which is formed in the tower body below the horizontal partition plate, to communicate with the inside of an exhaust gas supply duct, and an exhaust gas discharge port allowing the inside of an outlet side wind box space which is formed in the tower body above the horizontal partition plate, to communicate with the inside of an exhaust gas discharge duct.

[3] An adsorption tower used in an exhaust gas dry treatment device having an adsorption tower for adsorbing and removing the harmful components contained in an exhaust gas, using a granular adsorbent, which adsorbent tower comprises a first adsorption tower and a second adsorption tower installed above the first adsorption tower, the first adsorption tower and the second adsorption tower each comprising a box-shaped tower body, a plurality of reaction chambers which are vertically formed in the tower body so as to extend from a front tower wall side toward a rear tower wall facing the front tower wall and from a tower top wall to a tower bottom wall while being separated from the front tower wall by a predetermined distance, and which have moving beds therein, and vertical partition plates installed so as to alternately close the openings between the ends of reaction chambers at the front tower wall side and, as necessary, vertical partition plates installed so as to close the openings between the ends of reaction chambers at the front tower wall side and a tower inner wall, and which adsorption tower further comprises at least one connecting duct allowing the inside of at least one closed space formed in the first adsorption tower body by two facing reaction chambers, the rear tower wall and one vertical partition plate, to communicate with the inside of at least one closed space formed in the second adsorption tower body by two facing reaction chambers, the rear tower wall and one vertical partition plate, an exhaust gas supply port allowing the inside of an inlet side wind box space formed in the first adsorption tower body between the front tower wall and the vertical partition plates, to communicate with the inside of an exhaust gas supply duct, and an exhaust gas discharge port allowing the inside of an outlet side wind box space formed in the second adsorption tower body between the front tower wall and the vertical partition plates, to communicate with the inside of an exhaust gas discharge duct.

[4] An adsorption tower used in an exhaust gas dry treatment device having an adsorption tower for adsorbing and removing the harmful components contained in an exhaust gas, using a granular adsorbent, which adsorbent tower comprises a first adsorption tower, a second adsorption tower installed above the first adsorption tower, and connecting ducts connecting the first adsorption tower with the second adsorption tower, the first adsorption tower comprising a box-shaped tower body, a plurality of reaction chambers which are vertically formed in the tower body so as to extend from a front tower wall side toward a rear tower wall facing the front tower wall and from a tower top wall to a tower bottom wall while being separated from the front tower wall by a predetermined distance, and which have moving beds therein, vertical partition plates installed so as to alternately close the openings between the ends of each two facing reaction chambers at the front tower wall side and, as necessary, vertical partition plates installed so as to close the openings between the ends of reaction chambers at the front tower wall side and a tower inner wall, and an exhaust gas supply port allowing the inside of an inlet side wind box space formed in the first adsorption tower body between the front tower wall and the vertical partition plates, to communicate with the inside of an exhaust gas supply duct, the second adsorption tower comprising a box-shaped tower body, a plurality of reaction chambers which are vertically formed in the tower body so as to extend from a rear tower wall side toward a front tower wall facing the rear tower wall and from a tower top wall to a tower bottom wall while being separated from the rear tower wall by a predetermined distance, and which have moving beds therein, vertical partition plates installed so as to alternately close the openings between the ends of each two facing reaction chambers at the rear tower wall side and, as necessary, vertical partition plates installed so as to close the openings between the ends of reaction chambers at the rear tower wall side and a tower inner wall, and an exhaust gas discharge port allowing the inside of an outlet side wind box space formed in the second adsorption tower body between the rear tower wall and the vertical partition plates, to communicate with the inside of an exhaust gas discharge duct, and the connecting ducts comprising at least one connecting duct allowing the inside of at least one closed space formed in the first adsorption tower body by two facing reaction chambers, the rear tower wall and one vertical partition plate, to communicate with the inside of at least one closed space formed in the second adsorption tower body by two facing reaction chambers, the front tower wall and one vertical partition plate.

[5] The adsorption tower according to any of [1] to [4], wherein each reaction chamber comprises a plurality of units connected in a series and each unit formed in a box shape, comprises a gas-flowing section and having a gas-incoming surface and a gas-leaving surface at the two sides facing with each other in a direction intersecting at right angles with the connection direction of units, an adsorbent supply section formed above the gas-flowing section, and an adsorbent discharge section formed below the gas-flowing section.

Effect of the Invention

The adsorption tower of the present invention has, in the tower body, an inlet side wind box space and an outlet side wind box space. The exhaust gas supply port can be provided at any surface position of the tower body wall forming the inlet side wind box space. The exhaust gas discharge port can be provided at any surface position of the tower body wall forming the outlet side wind box space.

An exhaust gas is introduced into the inlet side wind box space from the exhaust gas supply port, enters a plurality of gas-incoming passages in a plurality of streams, then flows into a plurality of reaction chambers. The exhaust gas which has passed through the plurality of reaction chambers, flows into a plurality of gas-leaving passages, becomes a combined stream in the outlet side wind box space, then is discharged from the exhaust gas discharge port.

By employing such a structure, the adsorption tower of the present invention can have a single exhaust gas supply port and a single exhaust gas discharge port.

Unlike conventional adsorption towers, the adsorption tower of the present invention need not have duct sections of complicated shape and can have an exhaust gas supply port and an exhaust gas discharge port directly at the wall surface of box-shaped tower body. The present adsorption tower has a simple and compact structure; therefore, the construction cost can be reduced and the arrangement space can be lowered by 20 to 40% as compared with those of conventional adsorption towers. The exhaust gas supply duct and the exhaust gas discharge duct can be connected to the adsorption tower from any desired direction. Since the present adsorption tower has a simple structure, the inspection, maintenance, cleaning, etc. can be conducted simply in the operation, providing an economical adsorption tower.

BRIEF DESCRIPTION OF THE DRAWINGS

FIG. 4 is an arrangement view of the connection between adsorption tower and ducts and shows four examples (A), (B), (C) and (D).

Figure 1:
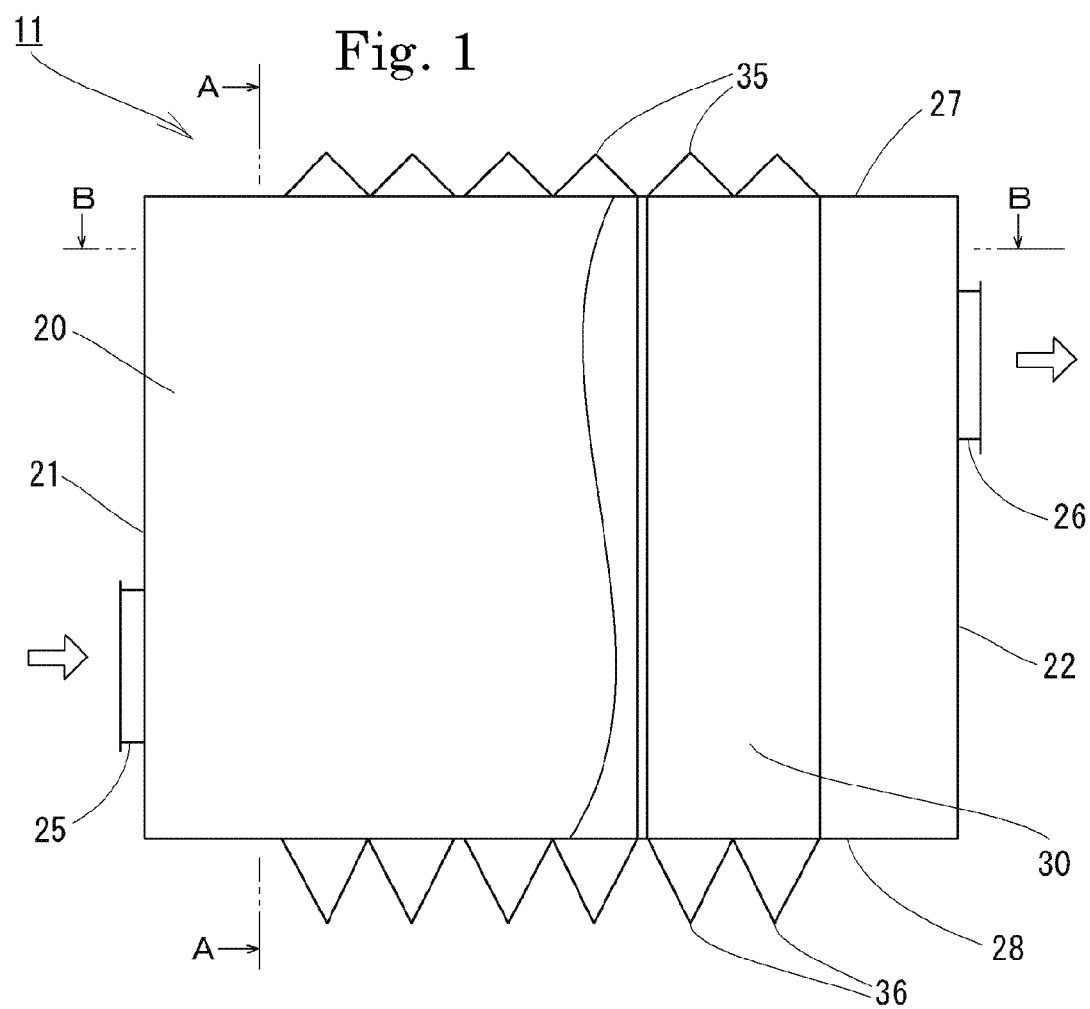
FIG. 1 is a schematic side view showing an example of the first embodiment of the adsorption tower of the present invention.

EXPLANATION OF SYMBOLS 10, 11, 12, 13, 14: each an adsorption tower
13a, 14a: each a first adsorption tower
13b, 14b: each a second adsorption tower
20: a tower body
21: a front tower wall
22: a rear tower wall
23, 24: each a side tower wall
25, 25a, 25b: each an exhaust gas supply port
26, 26a, 26b, 26c: each an exhaust gas discharge port
27: a tower top wall
28: a tower bottom wall
30: a unit
31: a gas-incoming surface
32: a gas-discharging surface
33, 34: each a side surface
35: a supply port
36: a discharge port
37: a supply section
38: a gas-flowing section
39: a discharge section
45a, 45b, 46a, 46b, 46c: each a duct section
51, 52, 53, 54: each a reaction chamber
60a, 60b, 60c, 60d, 60e, 60f: each a connecting duct
61, 62: each a closed space
71, 72, 73: each a lower partition plate
75, 76: each an upper partition plate
78: a horizontal partition plate
81, 82, 83, 85, 86: each a vertical partition plate
90: a regeneration tower
91: a sieve
92: an adsorbent tank
93: a by-product recovery apparatus
94, 95: each a conveyor line
96: a hopper
97: a chimney
98: an exhaust gas supply duct
99: an exhaust gas discharge duct

BEST MODE FOR CARRYING OUT THE INVENTION

Embodiments of the present invention are described below. The adsorption tower of the present invention has four embodiments. The first embodiment has an exhaust gas supply port at a front tower wall side and an exhaust gas discharge port at a rear tower wall side. The second embodiment has an exhaust gas supply port and an exhaust gas discharge port at a front tower wall side. The third embodiment is an adsorption tower having a first adsorption tower in the lower side and a second adsorption tower in the upper side in order to conduct a two-stage treatment, and has an exhaust gas supply port at the front tower wall side of the first adsorption tower and an exhaust gas discharge port at the front tower wall side of the second adsorption tower. The fourth embodiment is an adsorption tower having a first adsorption tower in the lower side and a second adsorption tower in the upper side in order to conduct a two-stage treatment, and has an exhaust gas supply port at the front tower wall side of the first adsorption tower and an exhaust gas discharge port at the rear tower wall side of the second adsorption tower.

Adsorption Tower of First Embodiment

Figure 2:
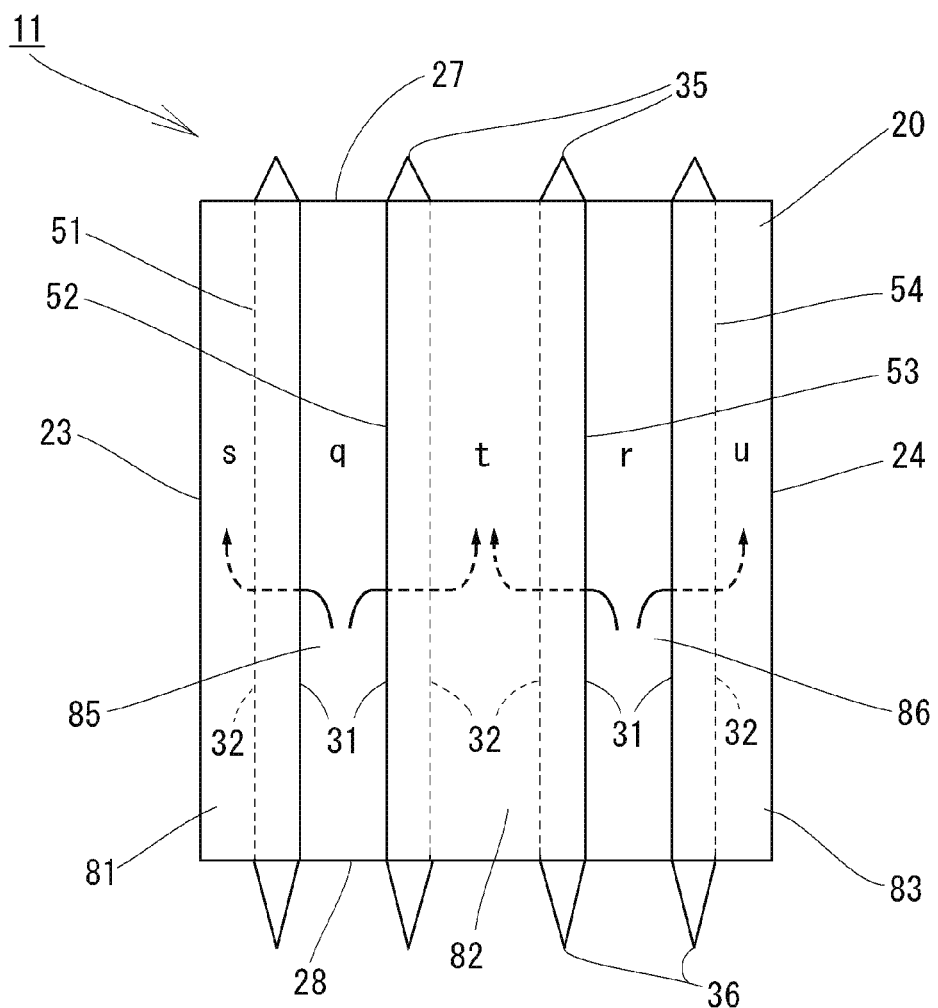
FIG. 2 is a schematic vertical sectional view taken at the A-A line of FIG. 1.
Figure 3:
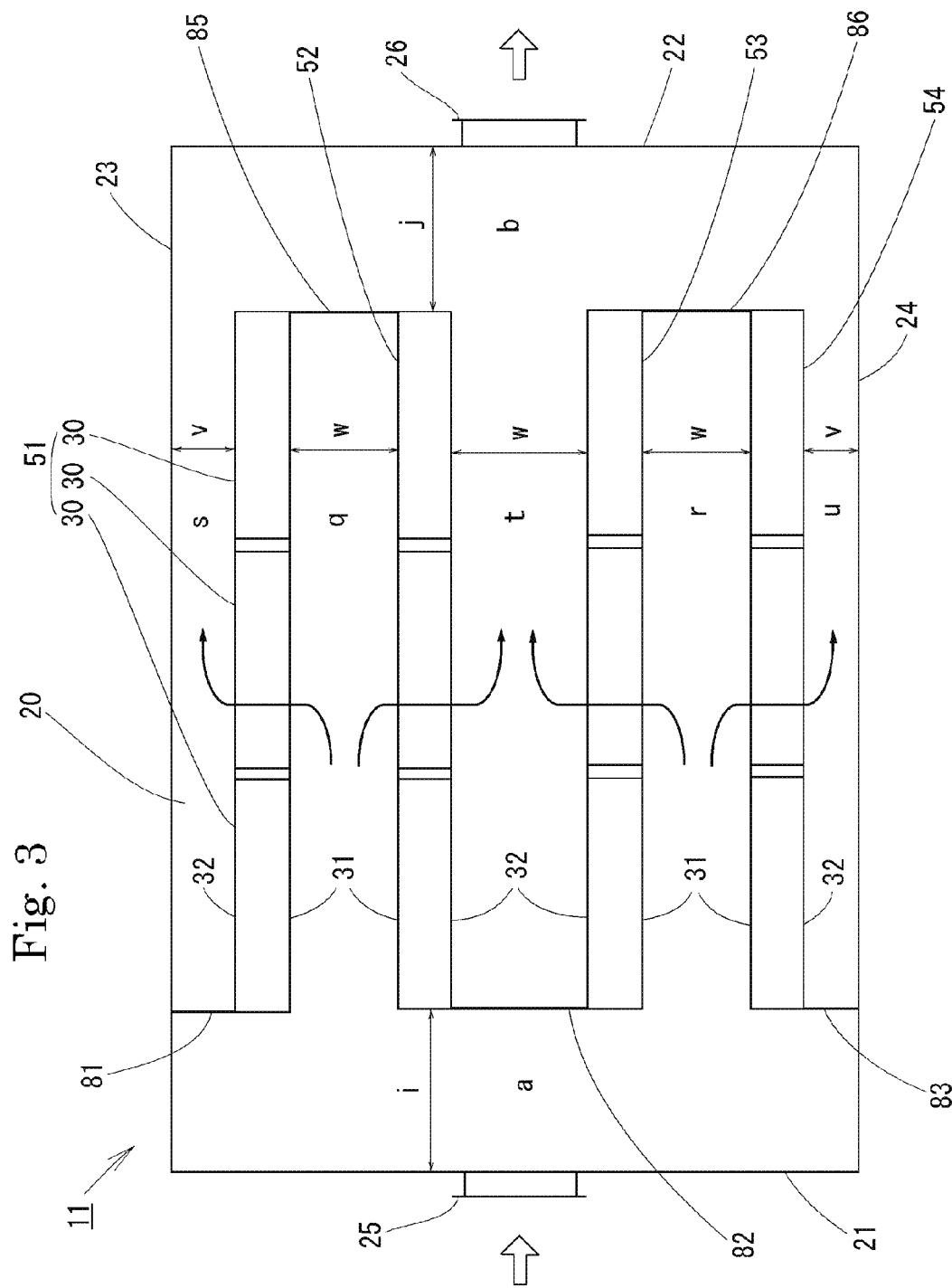
FIG. 3 is a schematic vertical sectional view taken at the B-B line of FIG. 1.

FIG. 1 shows a schematic side view of an adsorption tower 11 which is the first embodiment. FIG. 2 shows a schematic sectional view taken at the A-A line of FIG. 1. FIG. 3 shows a schematic sectional view taken at the B-B line of FIG. 1.

The adsorption tower 11 has, as shown in FIG. 2, a box-shaped tower body 20 and a plurality (four in the present case) of reaction chambers 51, 52, 53 and 54 vertically installed in the tower body 20 from a tower top wall 27 to a tower bottom wall 28. As shown in FIG. 3, the plurality of reaction chambers 51 to 54 are installed vertically and nearly parallel from a front tower wall side toward a rear tower wall side while being separated from a front tower wall 21 and a rear tower wall 22 by predetermined distances i and j, respectively, and have moving beds therein.

In the adsorption tower 11 of the present invention, a distance i is formed between the front tower wall 21 and the ends of the reaction chambers, whereby a wind box space a is formed at the inlet side of exhaust gas. Further in the adsorption tower 11 of the present invention, a distance j is formed between the rear tower wall 22 and the ends of the reaction chambers, whereby a wind box space b is formed at the outlet side of exhaust gas.

Figure 23:
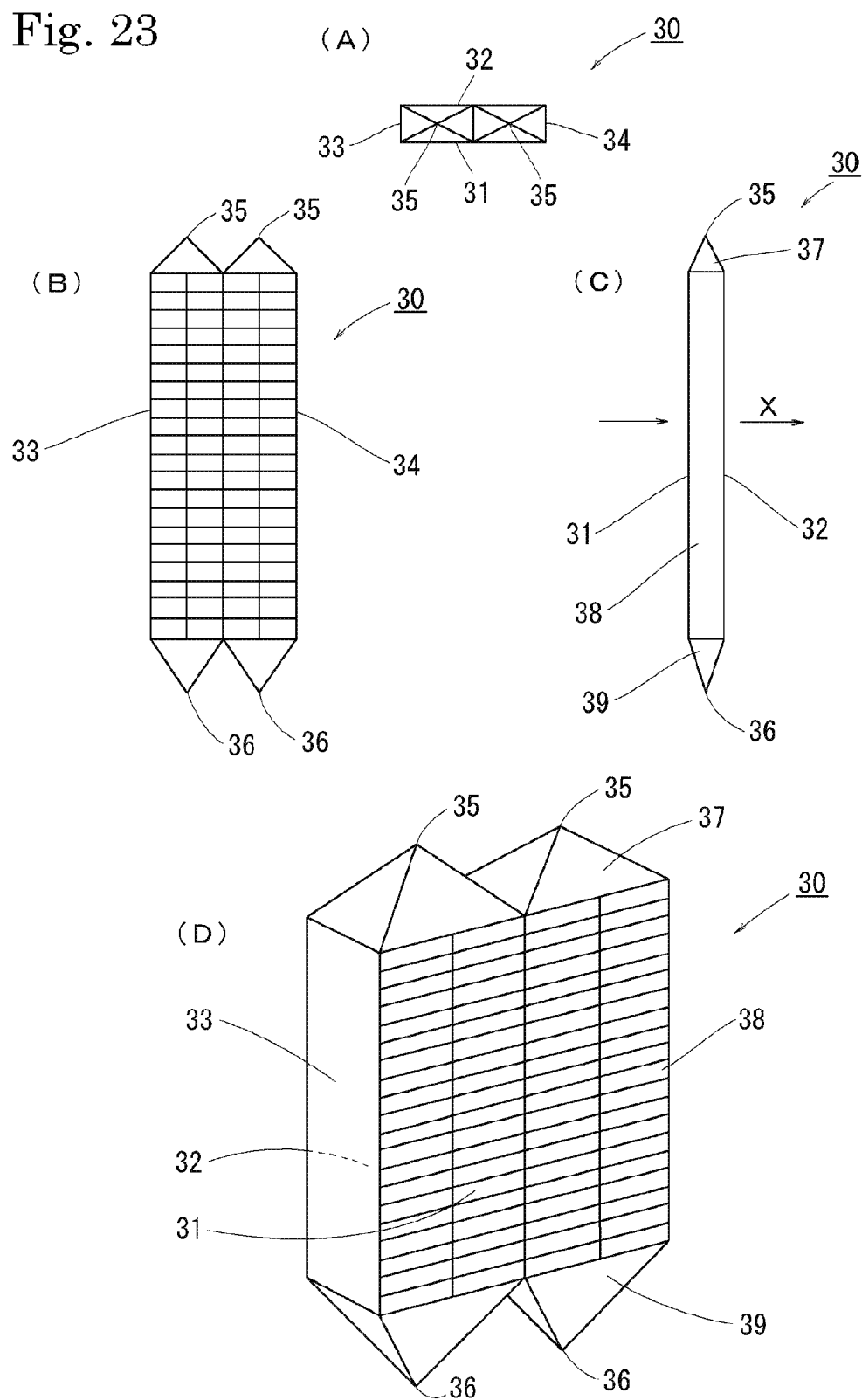
FIG. 23 is a schematic view showing an example of unit, wherein (A) is a plan view, (B) is a front view, (C) is a side view, and (D) is a perspective view.

The reaction chambers 51 to 54 are each constituted by a plurality (three in the present case) of units 30, 30 and 30. Each unit 30 has the same structure as shown in FIG. 23. The reaction chambers 51 to 54 are each formed in a box shape, as shown in FIG. 23. Each two sides of the reaction chambers 51 to 54, facing each other are a gas-incoming surface 31 and a gas-discharging surface 32, and these two surfaces form a gas-flowing section 38 through which gas passes. At the top of the gas-flowing section 38 is formed a supply section 37 equipped with an adsorbent supply port 35. At the bottom of the gas-flowing section 38 is formed a discharge section 39 equipped with an adsorbent discharge port 36.

As shown in FIG. 3, in each of the reaction chambers 51 to 54, three units 30 are connected. Two sides of the three units 30, facing each other in a direction intersecting at right angles with the unit-connecting direction are a gas-incoming surface 31 and a gas-discharging surface 32. The interfaces between each two adjacent units 30 are closed completely to prevent the passage of exhaust gas.

Vertical partition plates 81, 82, 83, 85 and 86 are sequentially fitted so as to close the openings between the ends of each two facing reaction chambers of 51 to 54 and the openings between the ends of reaction chambers and the side tower walls 23 and 24. That is, the side tower wall 23, the vertical partition plate 81, one end of the reaction chamber 51, other end of the reaction chamber 51, the vertical partition plate 85, other end of the reaction chamber 52, one end of the reaction chamber 52, the vertical partition plate 82, one end of the reaction chamber 53, other end of the reaction chamber 53, the vertical partition plate 86, other end of the reaction chamber 54, one end of the reaction chamber 54, the vertical partition plate 83, and the side tower wall 24 are connected sequentially, forming a comb teeth shape as a whole.

Thereby, the inside of the tower body 20 is divided into two portions, namely, a space including the inlet side wind box space a, through which an untreated exhaust gas passes, and a space including the outlet side wind box space b, through which a treated exhaust gas passes.

The reaction chambers 51 and 52 are arranged so that the respective gas-incoming surfaces 31 face each other, and the space q between the two surfaces communicates with the exhaust gas supply port 25 via the inlet side wind box space a. The reaction chambers 53 and 54 are arranged so that the respective gas-incoming surfaces 31 face each other, and the space r between the two surfaces communicates with the exhaust gas supply port 25 via the inlet side wind box space a.

The exhaust gas supply port 25 can be fitted to any of the front tower wall 21, the side tower walls 23 and 24, the tower top wall 27 and the tower bottom wall 28 as long as the exhaust gas supply port 25 faces the inlet side wind box space a. Therefore, the exhaust gas supply port 25 can be fitted at a position at which an exhaust gas supply duct 98 can be conveniently connected to the exhaust gas supply port 25.

The space s between the reaction chamber 51 and the side tower wall 23 communicates with the exhaust gas discharge port 26 via the outlet side wind box space b. The space t between the reaction chamber 52 and the reaction chamber 53 communicates with the exhaust gas discharge port 26 via the outlet side wind box space b. The space u between the reaction chamber 54 and the side tower wall 24 communicates with the exhaust gas discharge port 26 via the outlet side wind box space b.

The exhaust gas discharge port 26 can be fitted to any of the rear tower wall 22, the side tower walls 23 and 24, the tower top wall 27 and the tower bottom wall 28 as long as the exhaust gas discharge port 26 faces the outlet side wind box space b. Therefore, the exhaust gas discharge port 26 can be fitted at a position at which an exhaust gas discharge duct 99 can be conveniently connected to the exhaust gas discharge port 26, as shown in FIG. 4.

The distance i between the front tower wall 21 and the reaction chamber ends, the distance j between the rear tower wall 22 and the reaction chamber ends, the distance v between the side tower wall 23 and the reaction chamber 51, the distances w between each two facing reaction chambers of 51 to 54, and the distance v between the reaction chamber 54 and the side tower wall 24 can be determined appropriately in consideration of, for example, the pressure loss in the flow of exhaust gas. When the maintenance of the adsorption tower is considered, these distances i, j, v and w are preferably at least the distances through which a person can reach the above places.

The number of reaction chambers in the adsorption tower is at least two and may be an odd number or an even number. The upper limit of the number has no particular restriction but the number of reaction chambers is ordinarily 8 or smaller. One end of the reaction chamber 51 is connected to the side tower wall 23 by the vertical partition plate 81 but may be connected to the front tower wall 21. Or, one end of the reaction chamber 51 may be connected to both of the side tower wall 23 and the front tower wall 21 in order to prevent the formation of residual exhaust gas portion. The same applies to one end of the reaction chamber 54.

Figure 24:
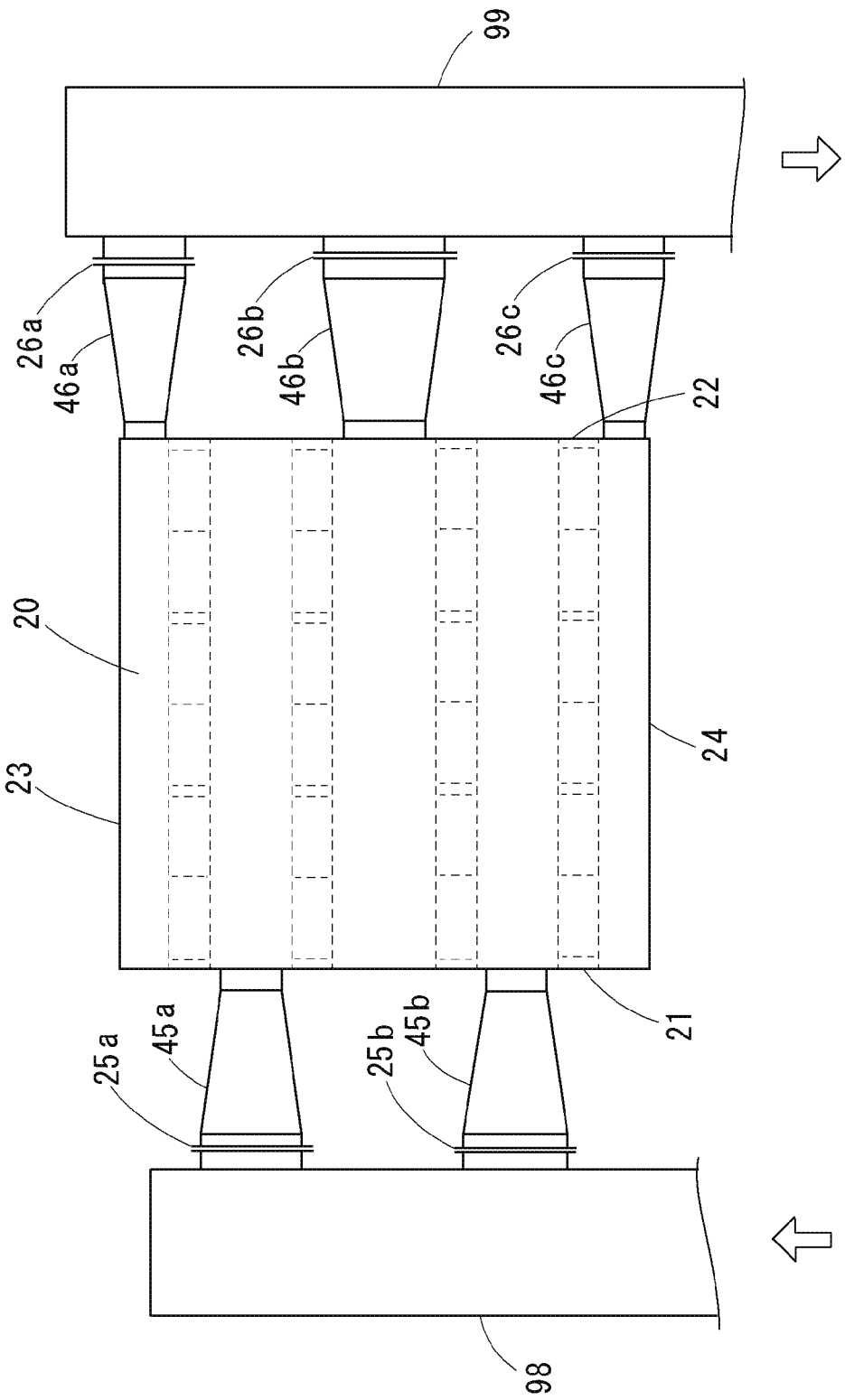
FIG. 24 is a view of duct arrangement in the adsorption tower of FIG. 20.
Figure 25:
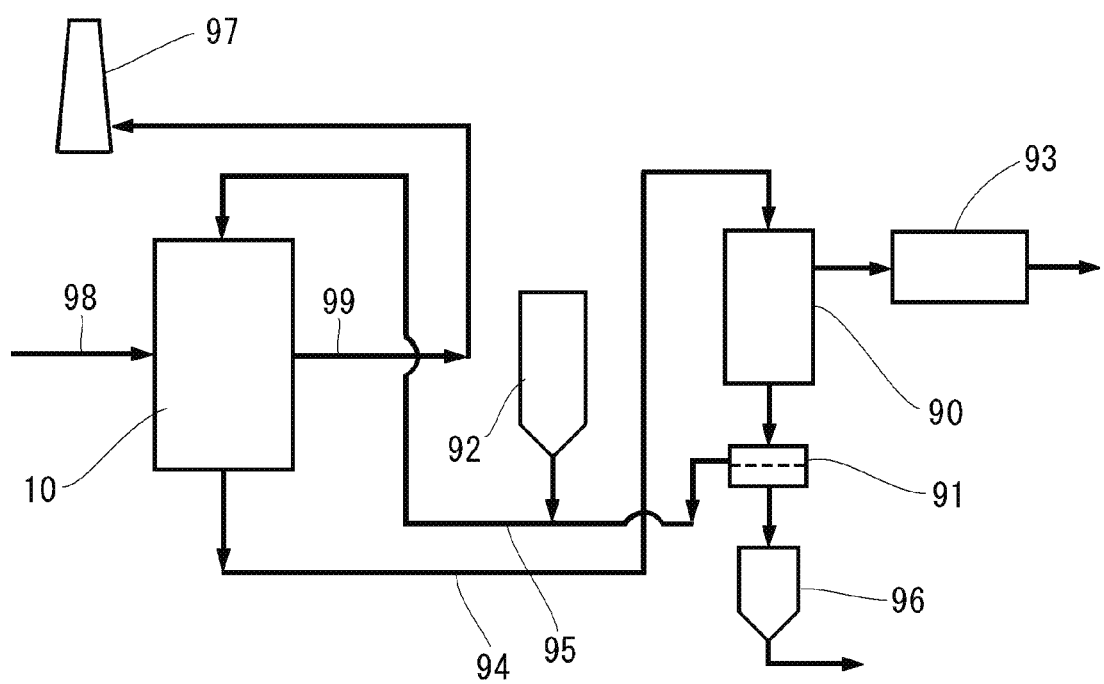
FIG. 25 is a flow chart showing the outline of an exhaust gas dry treatment device.

The adsorption tower 11, which is the first embodiment of the present invention, has none of ducts 45a, 45b, 46a, 46b and 46c which cause problems in conventional adsorption tower 10 as shown in FIG. 24. Therefore, the adsorption tower 11 has a very simple structure and can be made compact as a whole.

The exhaust gas supply duct 98 and the exhaust gas discharge duct 99 can be connected directly to the tower body 20 and, unlike the case shown in FIG. 24, need not be arranged parallel to the tower body 20. Accordingly, the construction cost is low and the arrangement space can be made small.

As shown in the examples (A), (B), (C) and (D) of FIG. 4, the exhaust gas supply duct 98 and the exhaust gas discharge duct 99 can be connected to the adsorption tower 11 in various modes. Accordingly, there is less restriction as to the arrangement of the adsorption tower 11, and the building site can be utilized effectively.

Figure 20:
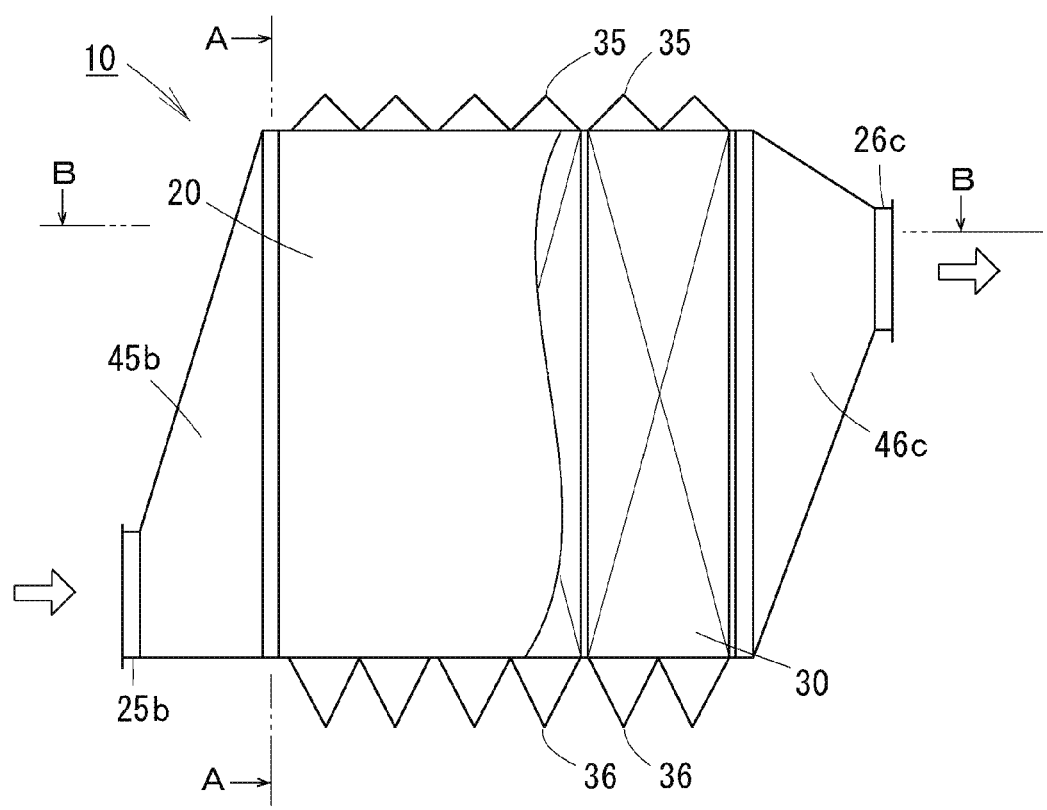
FIG. 20 is a schematic side view showing a conventional adsorption tower.
Figure 21:
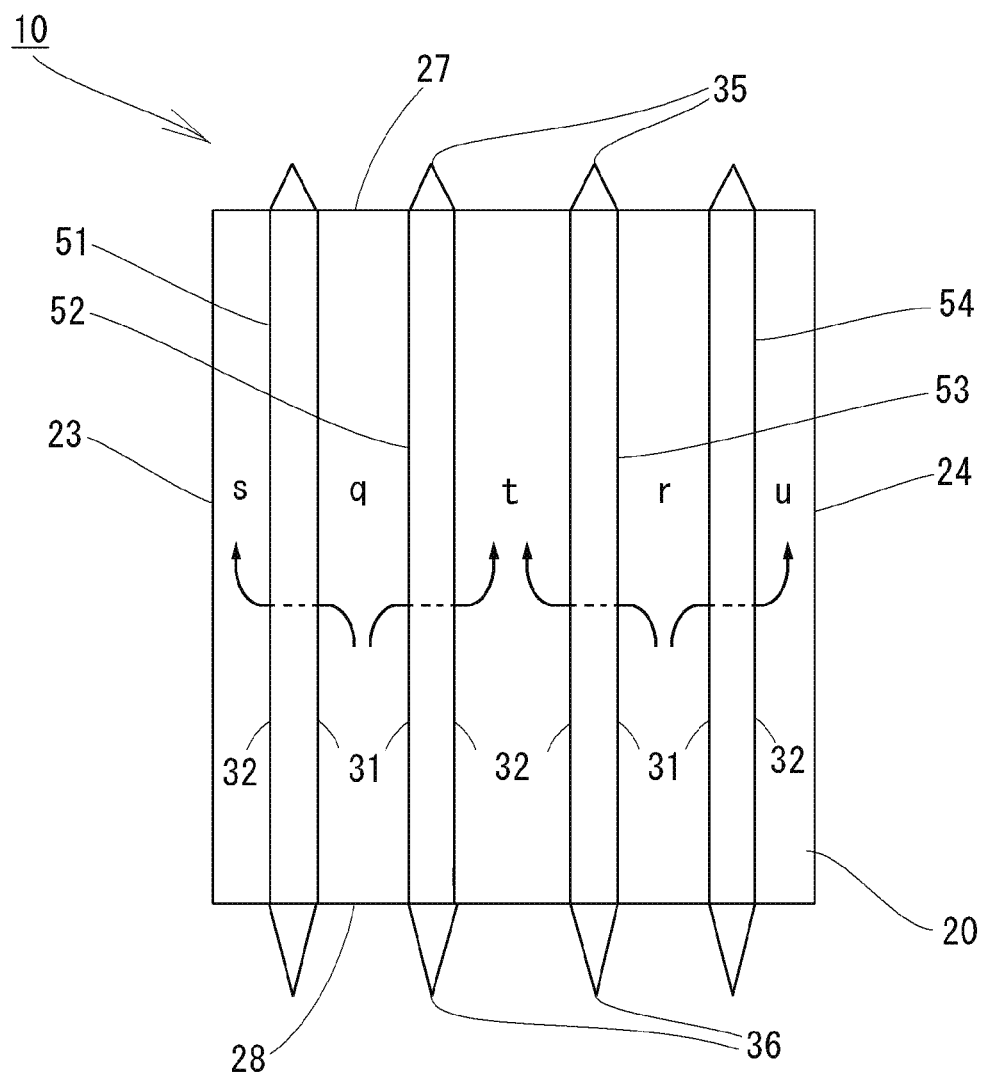
FIG. 21 is a schematic vertical sectional view taken at the A-A line of FIG. 20.
Figure 22:
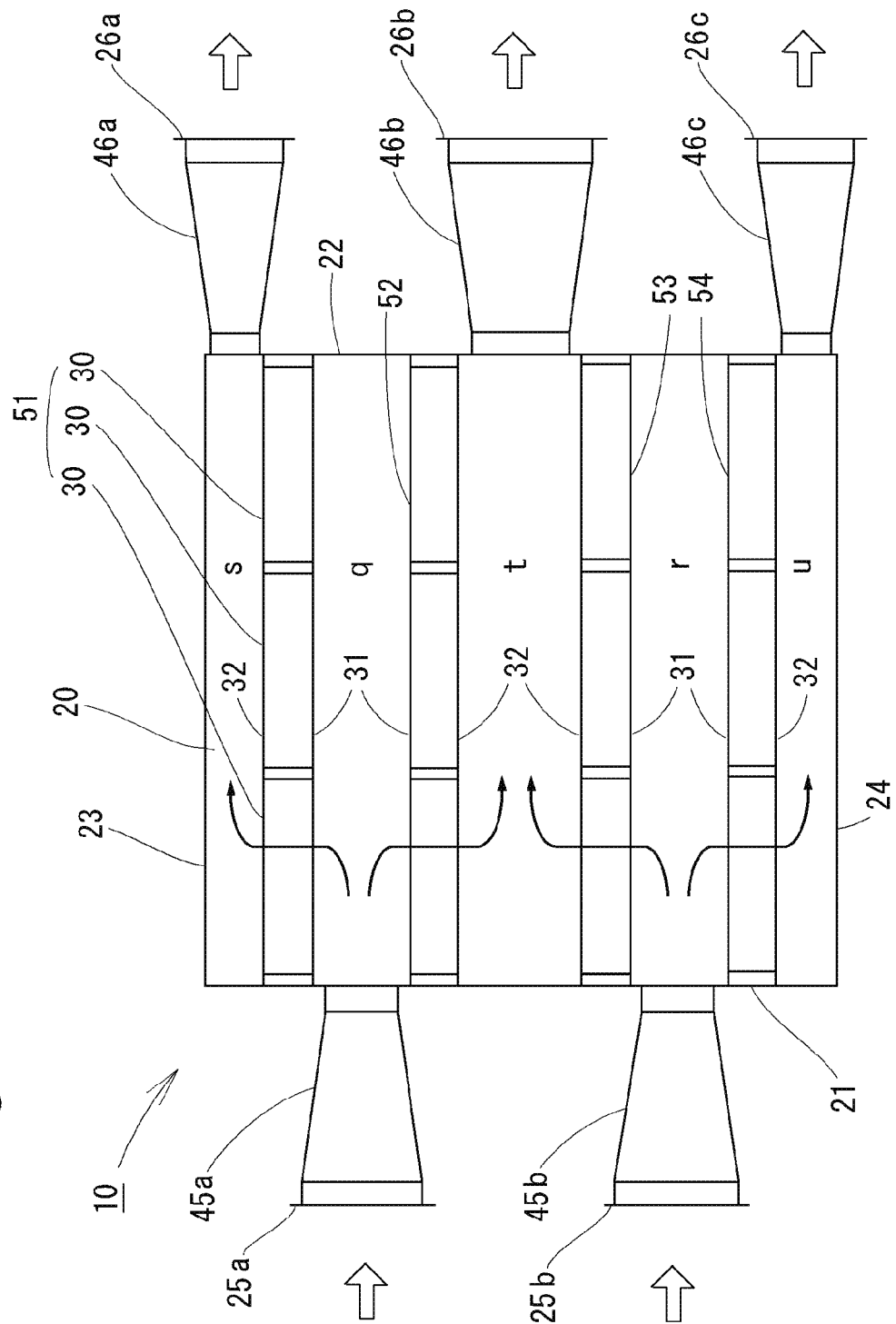
FIG. 22 is a schematic vertical sectional view taken at the B-B line of FIG. 20.

As shown in FIGS. 20 to 22, the inside of conventional adsorption tower 10 is divided into 5 portions by four reaction chambers 51 to 54. That is, there are five spaces therein. In contrast, the inside of the adsorption tower 11 of the present invention is divided into 2 portions and has only two spaces inside. Accordingly, the operations such as inside inspection, maintenance, cleaning and the like can be simplified, leading to higher economy.

Adsorption Tower of Second Embodiment

Figure 5:
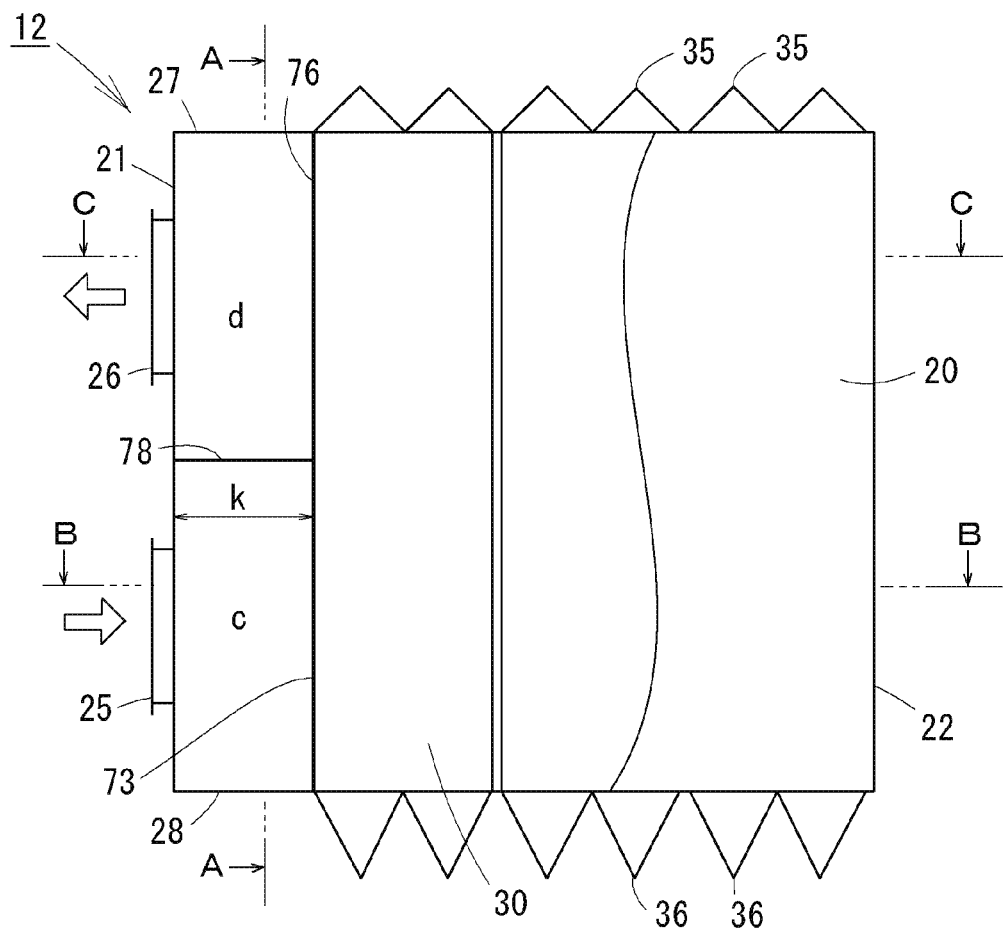
FIG. 5 is a schematic side view showing an example of the second embodiment of the adsorption tower of the present invention.
Figure 6:
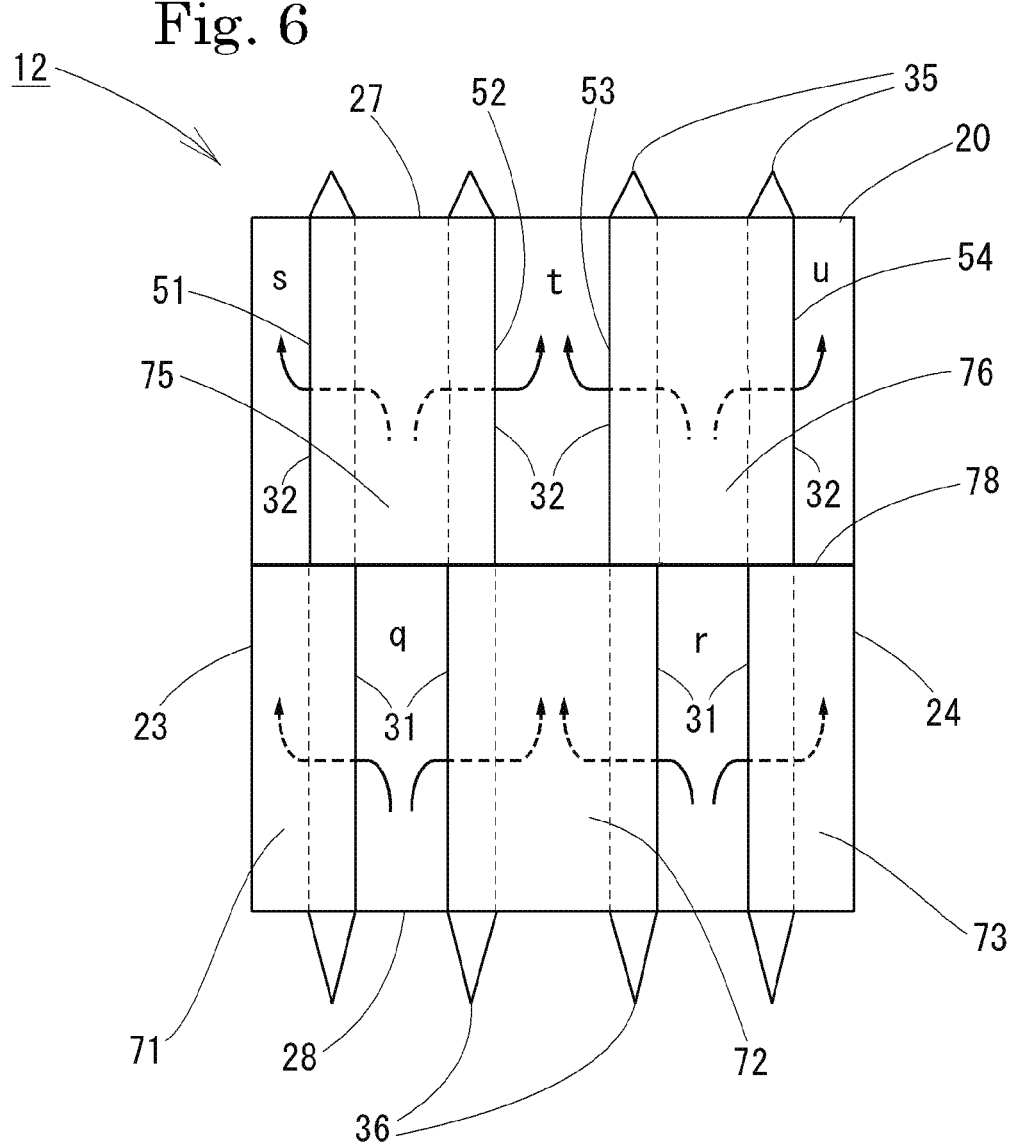
FIG. 6 is a schematic vertical sectional view taken at the A-A line of FIG. 5.
Figure 7:
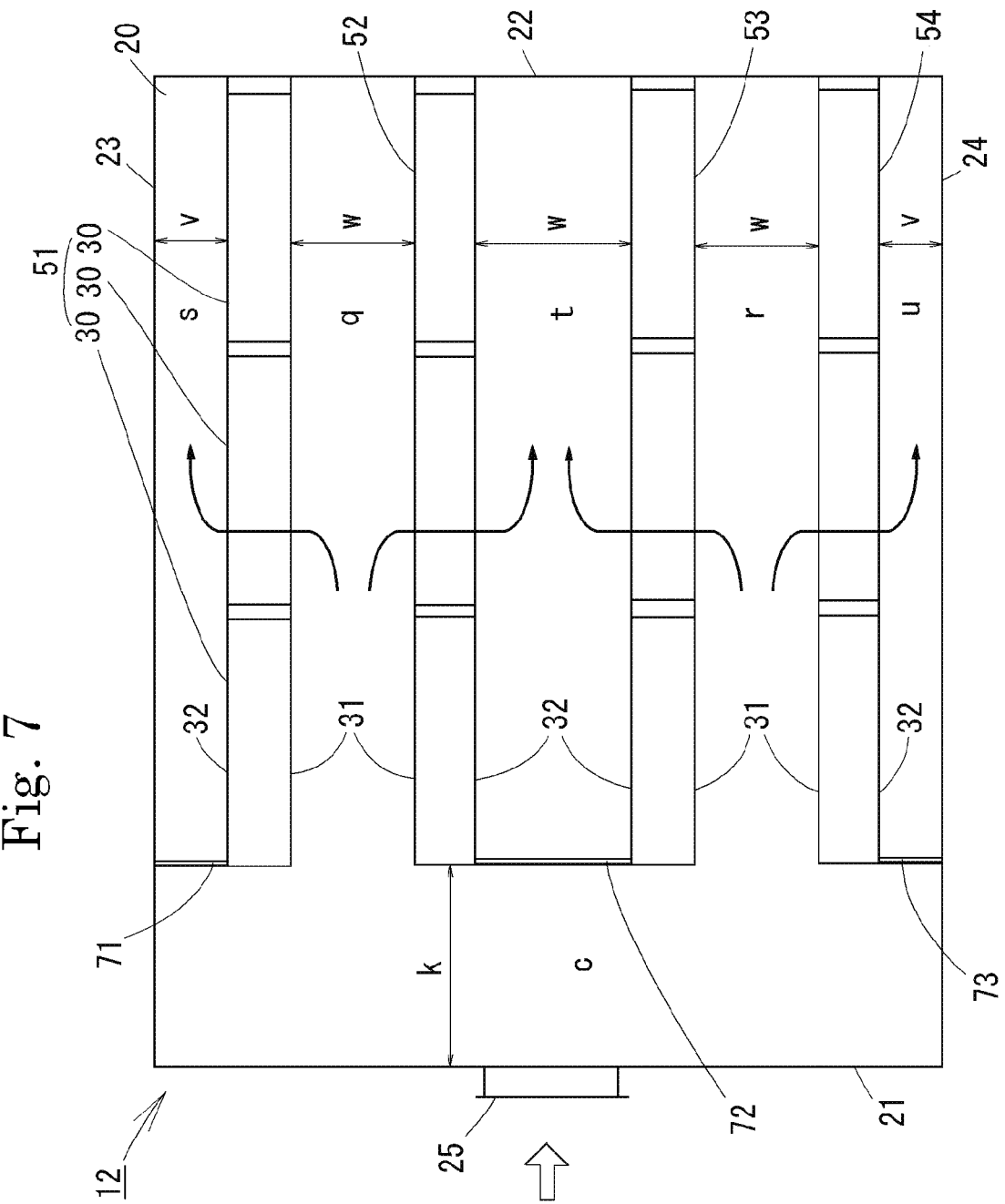
FIG. 7 is a schematic vertical sectional view taken at the B-B line of FIG. 5.
Figure 8:
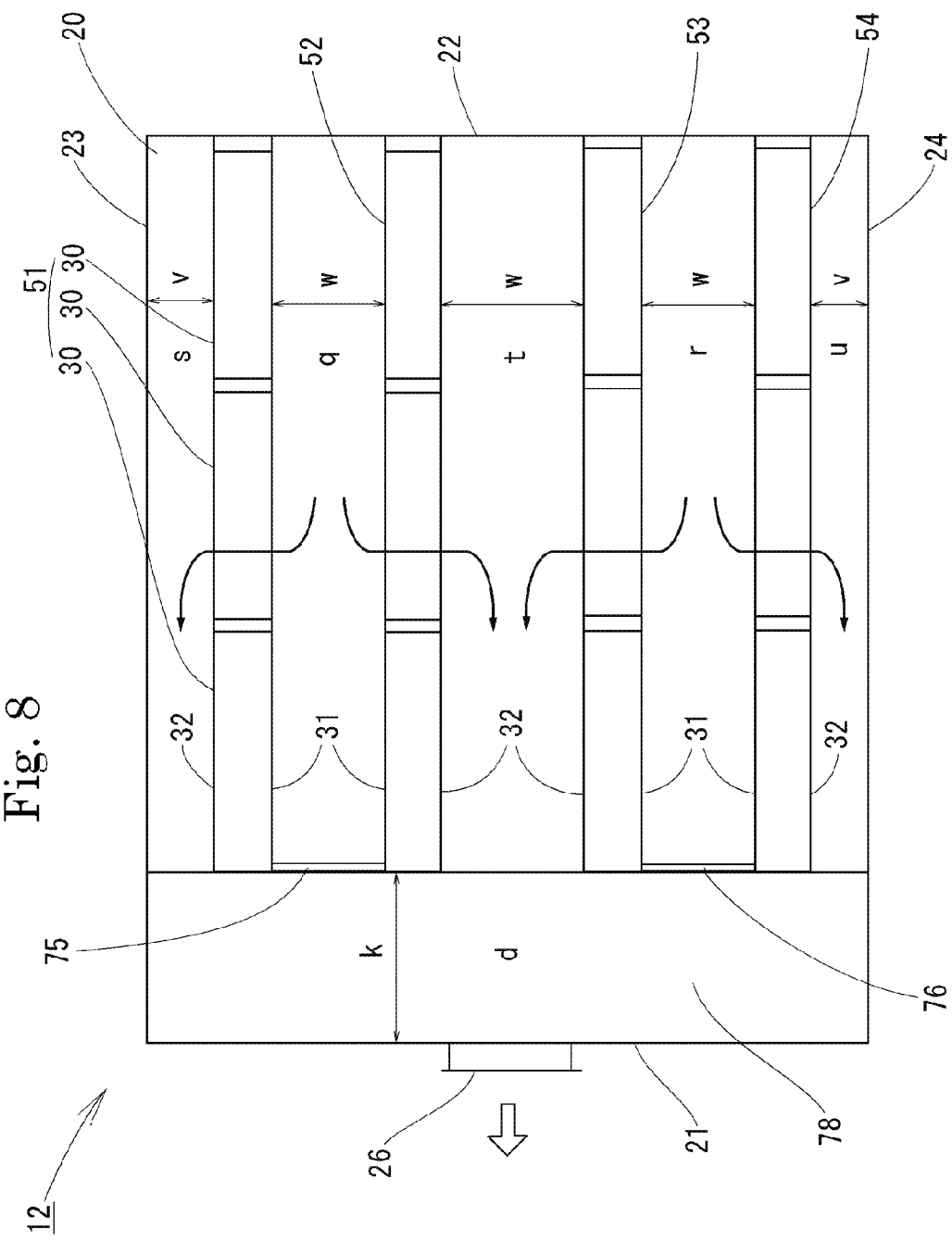
FIG. 8 is a schematic vertical sectional view taken at the C-C line of FIG. 5.

FIG. 5 shows a schematic side view of an adsorption tower 12 which is the second embodiment; FIG. 6 shows a schematic sectional view taken at the A-A line of FIG. 5; FIG. 7 shows a schematic sectional view taken at the B-B line of FIG. 5; and FIG. 8 shows a schematic sectional view taken at the C-C line of FIG. 5.

The adsorption tower 12 has a box-shaped tower body 20. Inside the tower body 20 is provided a horizontal partition plate 78 which is horizontally installed over the total width of a front tower wall 21 from the front tower wall 21 toward a rear tower wall 22 in a predetermined length k.

The adsorption tower 12 has, inside the tower body 20, a plurality of reaction chambers 51, 52, 53 and 54 which are vertically formed from the a tower top wall 27 to a tower bottom wall 28, as shown in FIG. 6. As shown in FIG. 8, the plurality of reaction chambers 51 to 54 are vertically formed nearly parallel between the horizontal partition plate 78 and the rear tower wall 22 and has moving beds therein.

As shown in FIG. 5, by providing the horizontal partition plate 78, there are formed, inside the adsorption tower 12 of the present invention, a wind box space c of exhaust gas inlet side below the horizontal partition plate 78 and a wind box space d of exhaust gas outlet side above the horizontal partition plate 78.

The reaction chambers 51 to 54 are each constituted by three units 30, 30 and 30. Each unit 30 has the same structure as shown in FIG. 23. The reaction chambers 51 to 54 are each formed in a box shape, as shown in FIG. 23. In each of two sides of the reaction chambers 51 to 54, facing each other are a gas-incoming surface 31 and a gas-discharging surface 32, and these two surfaces form a gas-flowing section 38. At the top of the gas-flowing section 38 is formed a supply section 37 equipped with an adsorbent supply port 35. At the bottom of the gas-flowing section 38 is formed a discharge section 39 equipped with an adsorbent discharge port 36.

In each of the reaction chambers 51 to 54, three units 30 are connected. Two sides of the three units 30, facing each other in a direction intersecting at right angles with the unit-connecting direction are a gas-incoming surface 31 and a gas-discharging surface 32. The interfaces between each two adjacent units 30 and the gaps between the unit 30 and the rear tower wall 22 are closed completely to prevent the passage of exhaust gas.

In the tower below the horizontal partition plate 78, there are alternately closed the openings between each one end of each two facing reaction chambers of 51 to 54 and the openings between each one end of reaction chambers and the side tower walls 23 and 24, by lower partition plates 71, 72 and 73. In the tower above the horizontal partition plate 78, there are alternately closed the openings between each one end of each two facing reaction chambers of 51 to 54 and the openings between each one end of reaction chambers and the side tower walls 23 and 24, by upper partition plates 75 and 76.

In closing the openings as above, the lower partition plates and the upper partition plates are arranged alternately so that no upper partition plate is installed above the lower partition plates 71, 72 and 73 and no lower partition plate is installed below the upper partition plates 75 and 76.

Thereby, the inside of the tower body 20 is divided into two portions, namely, a space including the inlet side wind box space c, through which an untreated exhaust gas passes, and a space including the outlet side wind box space d, through which a treated exhaust gas passes.

The reaction chambers 51 and 52 are arranged so that the respective gas-incoming surfaces 31 face each other, and the space q between the two surfaces communicates with the exhaust gas supply port 25 via the inlet side wind box space c. The reaction chambers 53 and 54 are arranged so that the respective gas-incoming surfaces 31 face each other, and the space r between the two surfaces communicates with the exhaust gas supply port 25 via the inlet side wind box space c.

The exhaust gas supply port 25 can be fitted to any of the front tower wall 21, the side tower walls 23 and 24 and the tower bottom wall 28 as long as the exhaust gas supply port 25 faces the inlet side wind box space c. Therefore, the exhaust gas supply port 25 can be fitted at a position at which an exhaust gas supply duct 98 can be conveniently connected to the exhaust gas supply port 25.

The space s between the reaction chamber 51 and the side tower wall 23 communicates with the exhaust gas discharge port 26 via the outlet side wind box space d. The space t between the reaction chamber 52 and the reaction chamber 53 communicates with the exhaust gas discharge port 26 via the outlet side wind box space d. The space u between the reaction chamber 54 and the side tower wall 24 communicates with the exhaust gas discharge port 26 via the outlet side wind box space d.

The exhaust gas discharge port 26 can be fitted to any of the front tower wall 21, the side tower walls 23 and 24 and the tower top wall 27 as long as the exhaust gas discharge port 26 faces the outlet side wind box space d. Therefore, the exhaust gas discharge port 26 can be fitted at a position at which an exhaust gas discharge duct 99 can be conveniently connected to the exhaust gas discharge port 26.

The length k of the horizontal partition plate 78, the distance v between the side tower wall 23 and the reaction chamber 51, the distances w between each two facing reaction chambers of 51 to 54, and the distance v between the reaction chamber 54 and the side tower wall 24 can be determined appropriately in consideration of the pressure loss in the flow of exhaust gas etc. When the maintenance of the adsorption tower is considered, these distances are preferably at least the distances through which a person can enter the adsorption tower.

The number of reaction chambers formed in the adsorption tower is at least two and may be an odd number or an even number. The upper limit of the number has no particular restriction but the number of reaction chambers is ordinarily 8 or smaller. Below the horizontal partition plate 78, one end of the reaction chamber 51 is connected to the side tower wall 23 by the lower partition plate 71 but may be connected to the front tower wall 21. Or, one end of the reaction chamber 51 may be connected to both of the side tower wall 23 and the front tower wall 21 in order to prevent the formation of residual exhaust gas portion. The same applies to one end of the reaction chamber 54.

The adsorption tower 12, which is the second embodiment of the present invention, has none of ducts 45a, 45b, 46a, 46b and 46c which cause problems in conventional adsorption tower 10. Therefore, the adsorption tower 12 has a very simple structure and can be made compact as a whole.

The exhaust gas supply duct 98 and the exhaust gas discharge duct 99 can be connected directly to the tower body 20 and, unlike the case shown in FIG. 24, need not be arranged parallel to the tower body 20. Accordingly, the construction cost is low and the arrangement space can be made small.

Figure 9:
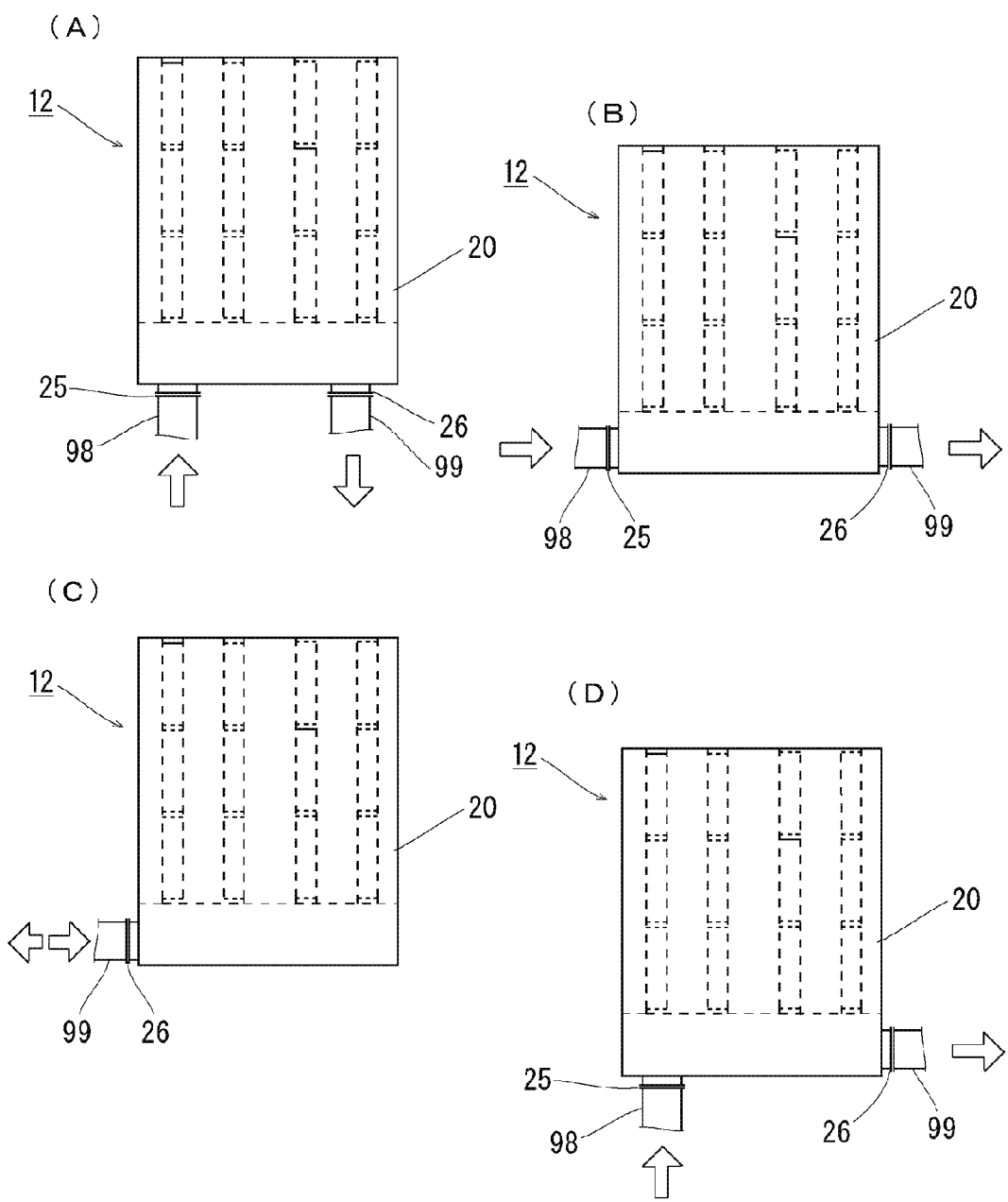
FIG. 9 is an arrangement view of the connection between adsorption tower and ducts and shows four examples (A), (B), (C) and (D).

As shown in the examples (A), (B), (C) and (D) of FIG. 9, the exhaust gas supply duct 98 and the exhaust gas discharge duct 99 can be connected to the adsorption tower 12 in various modes. Accordingly, there is less restriction as to the arrangement of the adsorption tower 12, and the building site can be utilized effectively.

In the conventional adsorption tower 10 shown in FIGS. 20 to 22, the inside of the tower is divided into 5 portions by four reaction chambers 51 to 54. That is, there are five spaces therein. In contrast, the inside of the adsorption tower 12 of the present invention is divided into 2 portions and has only two spaces inside. Accordingly, the operations such as inside inspection, maintenance, cleaning and the like can be simplified, leading to higher economy.

In the adsorption tower of the second embodiment, the openings between one end of the reaction chamber 51 and the side tower wall 23 was closed by the lower partition plate 78, in the tower below the horizontal partition plate 78. Meanwhile, in the tower above the horizontal partition plate, the openings between the end of the reaction chamber 51 and the side tower wall 23 is not closed by any upper partition plate. However, the arrangement of the upper partition plate and the lower partition plate above and below the horizontal partition plate may be opposite to the above arrangement. In this case, in the tower above the horizontal partition plate, one end of the reaction chamber 51 and the side tower wall 23 is closed by an upper partition plate and, in the tower below the horizontal partition plate 78, no lower partition plate is installed between the reaction chamber 51 and the side tower wall 23. Thus, whether or not a partition plate is installed between the side tower wall 23 and the reaction chamber adjacent to the side tower wall 23, should be determined depending upon the constitution of reaction chambers inside the tower. Accordingly, the partition plate installed at the openings between the side tower wall 23 and the reaction chamber adjacent to the side tower wall 23 is installed as necessary.

Adsorption Tower of Third Embodiment

Figure 10:
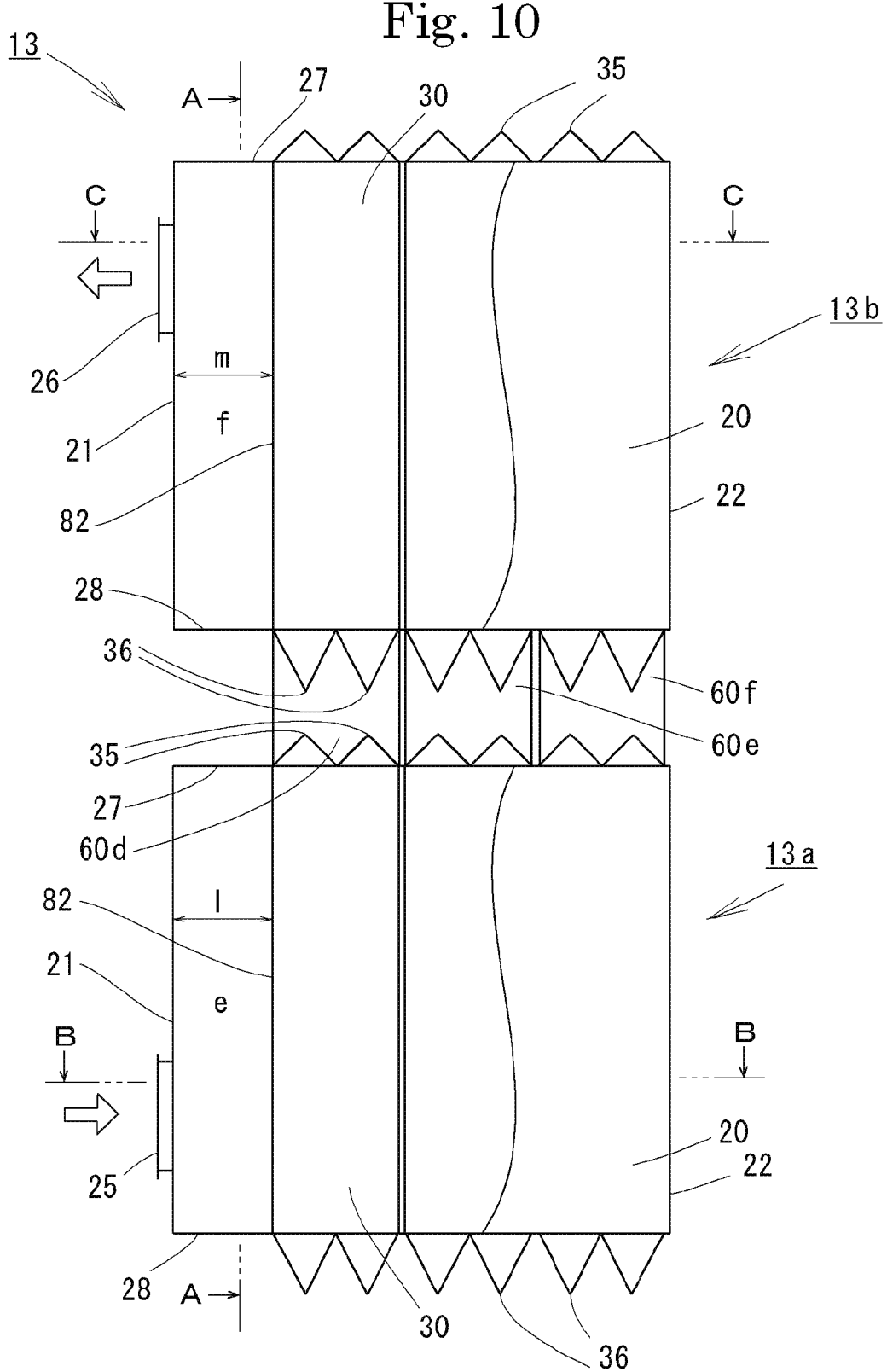
FIG. 10 is a schematic side view showing an example of the third embodiment of the adsorption tower of the present invention.
Figure 11:
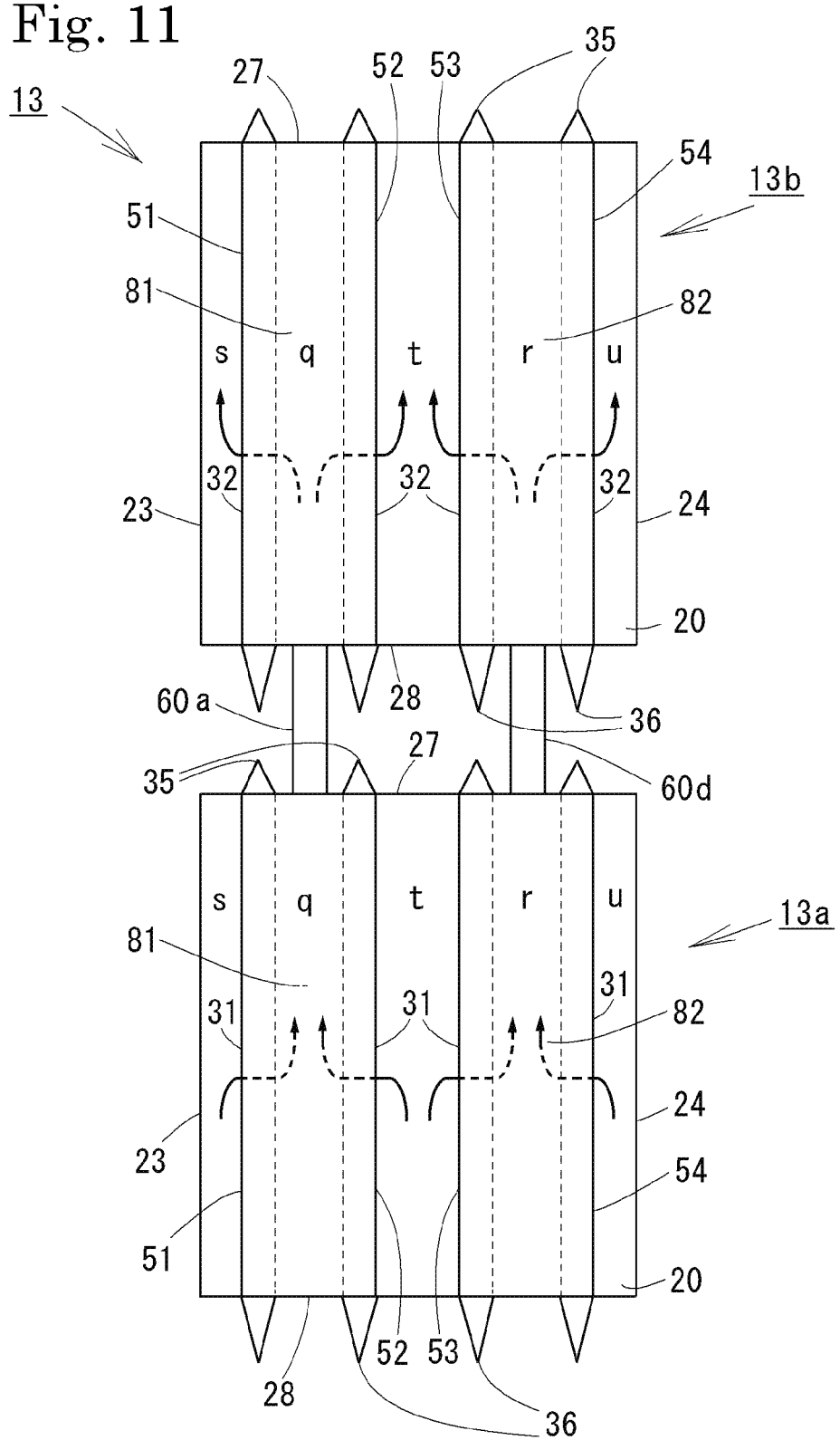
FIG. 11 is a schematic vertical sectional view taken at the A-A line of FIG. 10.
Figure 12:
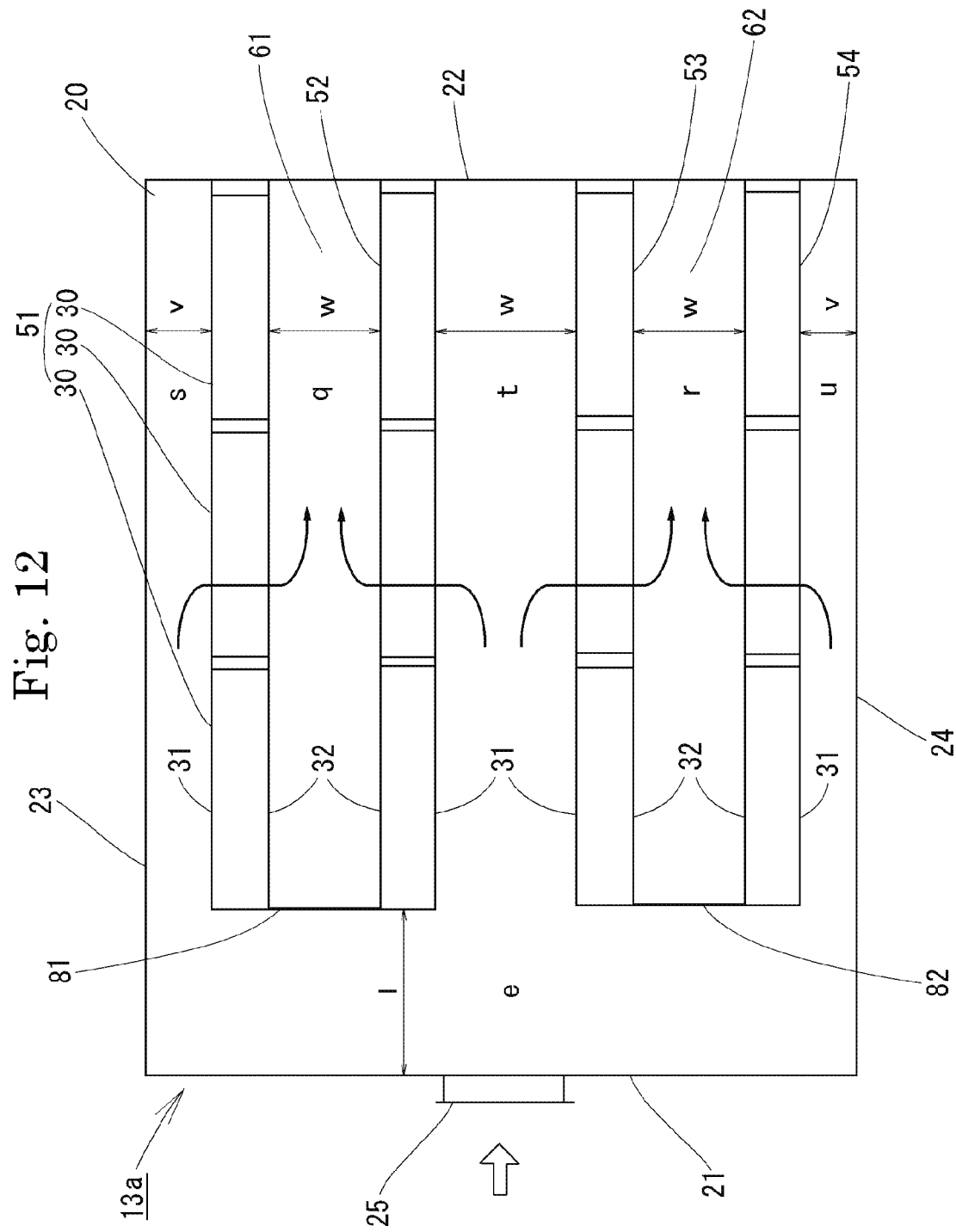
FIG. 12 is a schematic vertical sectional view taken at the B-B line of FIG. 10.
Figure 13:
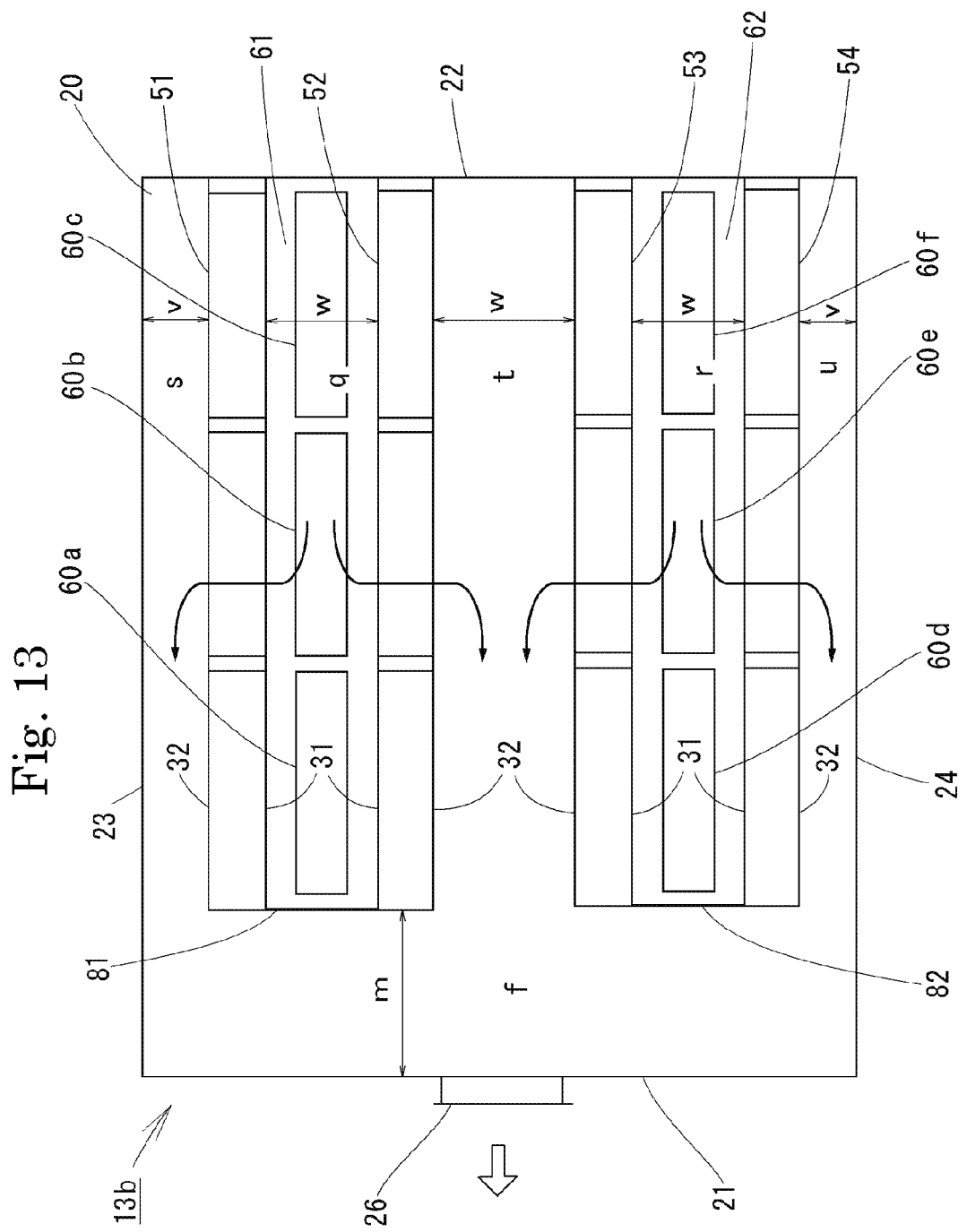
FIG. 13 is a schematic vertical sectional view taken at the C-C line of FIG. 10.

FIG. 10 shows a schematic side view of an adsorption tower 13 which is the third embodiment; FIG. 11 shows a schematic sectional view taken at the A-A line of FIG. 10; FIG. 12 shows a schematic sectional view taken at the B-B line of FIG. 10; and FIG. 13 shows a schematic sectional view taken at the C-C line of FIG. 10.

The adsorption tower 13 comprises, as shown in FIG. 10, a first adsorption tower 13a and a second adsorption tower 13b arranged above the first adsorption tower 13a.

As shown in FIG. 11, the first adsorption tower 13a has a boxed-shaped tower body 20 and a plurality of reaction chambers 51, 52, 53 and 54 vertically formed inside the tower body 20 from a tower top wall 27 to a tower bottom wall 28. As shown in FIG. 12, the plurality of reaction chambers 51 to 54 are vertically formed nearly parallel from a front tower wall 21 side toward a rear tower wall 22 while being separated from the front tower wall 21 by a predetermined distance 1, and have moving beds therein.

In the first adsorption tower 13a, a distance 1 is formed between the front tower wall 21 and the ends of reaction chambers, whereby a wind box space e of exhaust gas inlet side is formed.

The reaction chambers 51 to 54 are each constituted by three units 30, 30 and 30. Each unit 30 has the same structure as shown in FIG. 23. The reaction chambers 51 to 54 are each formed in a box shape, as shown in FIG. 23. Each two sides of the reaction chambers 51 to 54, facing each other are a gas-incoming surface 31 and a gas-discharging surface 32, and these two surfaces form a gas-flowing section 38 through which a gas passes. At the top of the gas-flowing section 38 is formed a supply section 37 equipped with an adsorbent supply port 35. At the bottom of the gas-flowing section 38 is formed a discharge section 39 equipped with an adsorbent discharge port 36.

In each of the reaction chambers 51 to 54, three units 30 are connected. In each of two sides of the three units 30, facing each other in a direction intersecting at right angles with the unit-connecting direction are a gas-incoming surface 31 and a gas-discharging surface 32. The interfaces between each two adjacent units 30 and the gaps between the unit 30 and the rear tower wall 22 are closed completely to prevent the passage of exhaust gas.

In the ends of the reaction chambers at the front tower wall 21 side, the openings between the end of each two facing reaction chambers are closed alternately by vertical partition plates 81 and 82. Inside the tower body 20 (the first adsorption tower 13a) is formed a closed space 61 by the two reaction chambers 51 and 52, the rear tower wall 22 and the vertical partition plate 81. Further, a closed space 62 is formed by the two reaction chambers 53 and 54, the rear tower wall 22 and the vertical partition plate 82.

Thereby, the tower body 20 inside is divided into a space including the inlet side wind box space e, through which an untreated exhaust gas passes, and spaces constituted by the closed spaces 61 and 62, through which an exhaust gas after first-stage treatment passes.

The reaction chambers 51 and 52 forming the closed space 61 are arranged so that the respective gas-discharging surfaces 32 face each other, and the space q between them communicate with the insides of connecting ducts 60a, 60b and 60c connected to the second adsorption tower 13b (FIG. 13). Similarly, the reaction chambers 53 and 54 forming the closed space 62 are arranged so that the respective gas-discharging surfaces 32 face each other, and the space r between them communicate with the insides of connecting ducts 60d, 60e and 60f.

The space s between the reaction chamber 51 and the side tower wall 23 communicates with an exhaust gas supply port 25 via the inlet side wind box space e. The space t between the reaction chamber 52 and the reaction chamber 53 communicates with the exhaust gas supply port 25 via the inlet side wind box space e. The space u between the reaction chamber 54 and the side tower wall 24 communicates with the exhaust gas supply port 25 via the inlet side wind box space e.

The exhaust gas supply port 25 can be fitted to any of the front tower wall 21, the side tower walls 23 and 24, the tower top wall 27 and the tower bottom wall 28 as long as the exhaust gas supply port 25 faces the inlet side wind box space e. Therefore, the exhaust gas supply port 25 can be fitted at a position at which an exhaust gas supply duct 98 can be conveniently connected to the exhaust gas supply port 25.

The distance 1 between the front tower wall 21 and the reaction chamber ends, the distance v between the side tower wall 23 and the reaction chamber 51, the distances w between each two facing reaction chambers of 51 to 54, and the distance v between the reaction chamber 54 and the side tower wall 24 can be determined appropriately in consideration of, for example, the pressure loss in the flow of exhaust gas. When the maintenance of the adsorption tower is considered, the distances v and w are preferably at least the distances through which a person can enter the adsorption tower.

The number of reaction chambers formed in the adsorption tower is at least two and may be an odd number or an even number. The upper limit of the number has no particular restriction but the number of reaction chambers is ordinarily 8 or smaller. The vertical partition plates 81 and 82 are installed in order to close the openings between the ends of two facing reaction chambers; however, as necessary, vertical partition plates are installed in order to close the openings between the reaction chamber ends of front tower wall side and the tower inner wall.

As shown in FIG. 11, the second adsorption tower 13b has a boxed-shaped tower body 20 and a plurality of reaction chambers 51, 52, 53 and 54 vertically formed inside the tower body 20 from a tower top wall 27 to a tower bottom wall 28. As shown in FIG. 13, the plurality of reaction chambers 51 to 54 are vertically formed nearly parallel from a front tower wall side toward a rear tower wall 22 while being separated from the front tower wall 21 by a predetermined distance m, and have moving beds therein.

In the second adsorption tower 13b, a distance m is formed between the front tower wall 21 and the ends of reaction chambers, whereby a wind box space f of exhaust gas outlet side is formed.

As shown in FIG. 13, the reaction chambers 51 to 54 are each constituted by three units 30, 30 and 30. Each unit 30 has the same structure as shown in FIG. 23. The reaction chambers 51 to 54 are each formed in a box shape, as shown in FIG. 23. Each two sides of the reaction chambers 51 to 54, facing each other are a gas-incoming surface 31 and a gas-discharging surface 32. A gas passes through these surfaces and passes through a gas-flowing section 38. At the top of the gas-flowing section 38 is formed a supply section 37 equipped with an adsorbent supply port 35. At the bottom of the gas-flowing section 38 is formed a discharge section 39 equipped with an adsorbent discharge port 36.

In each of the reaction chambers 51 to 54, three units 30 are connected. Two sides of the three units 30, facing each other in a direction intersecting at right angles with the unit-connecting direction are a gas-incoming surface 31 and a gas-discharging surface 32. The interfaces between each two adjacent units 30 and the gaps between the unit 30 and the rear tower wall 22 are closed completely to prevent the passage of exhaust gas.

In the ends of the reaction chambers at the front tower wall 21 side, the openings between each two facing reaction chambers are closed alternately by vertical partition plates 81 and 82. Inside the tower body 20 (the second adsorption tower 13b) is formed a closed space 61 by the two reaction chambers 51 and 52, the rear tower wall 22 and the vertical partition plate 81. Further, a closed space 62 is formed by the two reaction chambers 53 and 54, the rear tower wall 22 and the vertical partition plate 82.

Thereby, the inside of the tower body 20 is divided into a space comprising the closed spaces 61 and 62, through which an exhaust gas after the first-stage treatment passes, and a space including the outlet side wind box space f, through which an exhaust gas after the second-stage treatment passes.

The reaction chambers 51 and 52 forming the closed space 61 are arranged so that the respective gas-incoming surfaces 31 face each other. The space q formed by the closed space 61 communicates with the insides of the connecting ducts 60a, 60b and 60c connected to the first adsorption tower 13a. Similarly, the reaction chambers 53 and 54 forming the closed space 62 are arranged so that the respective gas-incoming surfaces 31 face each other. The space r formed by the closed space 62 communicates with the insides of the connecting ducts 60d, 60e and 60f.

The space s between the reaction chamber 51 and the side tower wall 23 communicates with the exhaust gas discharge port 26 via the outlet side wind box space f. The space t between the reaction chamber 52 and the reaction chamber 53 communicates with the exhaust gas discharge port 26 via the outlet side wind box space f. The space u between the reaction chamber 54 and the side tower wall 24 communicates with the exhaust gas discharge port 26 via the outlet side wind box space f.

The exhaust gas discharge port 26 can be fitted to any of the front tower wall 21, the side tower walls 23 and 24, the tower top wall 27 and the tower bottom wall 28 as long as the exhaust gas discharge port 26 faces the outlet side wind box space f. Therefore, the exhaust gas discharge port 26 can be fitted at a position at which the exhaust gas discharge duct 99 can be conveniently connected to the exhaust gas discharge port 26.

The distance m between the front tower wall 21 and the reaction chamber ends, the distance v between the side tower wall 23 and the reaction chamber 51, the distances w between each two facing reaction chambers of 51 to 54, and the distance v between the reaction chamber 54 and the side tower wall 24 can be determined appropriately in consideration of, for example, the pressure loss in the flow of exhaust gas. When the maintenance of the adsorption tower is considered, the above distances are preferably at least the distances through which a person can enter the adsorption tower.

The number of reaction chambers formed in the adsorption tower is at least two and may be an odd number or an even number. The upper limit of the number has no particular restriction but the number of reaction chambers is ordinarily 8 or smaller. The vertical partition plates 81 and 82 are installed in order to close the openings between the ends of two facing reaction chambers; however, as necessary, vertical partition plates may be installed so as to close the openings between the reaction chamber ends at the front tower wall side and the tower inner wall to form closed spaces by the side tower walls, the rear tower wall, reaction chambers and the vertical partition plates.

The adsorption tower 13, which is the third embodiment of the present invention, is a device which has the first adsorption tower 13a and the second adsorption tower 13b to conduct a two-stage treatment of exhaust gas. It is preferred that the reaction chambers 51 to 54 of the first adsorption tower 13a and the reaction chambers 51 to 54 of the second adsorption tower 13b are manufactured in the nearly same plan view and that the respective reaction chambers are arranged so as to pile up.

The exhaust gas after the first-stage treatment in the first adsorption tower 13a is sent to the second adsorption tower 13b via the connecting ducts 60a to 60f and is subjected to the second-stage treatment there. With the arrangement of the first adsorption tower 13a and the second adsorption tower 13b in the above-mentioned shape, the connecting ducts 60a to 60f can each have a simple and small shape.

The adsorbent is used in the second adsorption tower 13b and then used in the first adsorption tower 13a. Owing to the above-mentioned shape and arrangement of these adsorption towers, the adsorbent discharge port 36 of each unit 30 of the second adsorption tower 13b and the adsorbent supply port 35 of each unit 30 of the first adsorption tower 13a can be positioned close and can be connected to each other using a short pipe. As a result, the adsorbent is introduced from the supply port 35 of the second adsorption tower 13b, is subjected to the second-stage treatment and the first-stage treatment, and is discharged from the discharge port 36 of the first adsorption tower 13a.

The adsorption tower 13, which is the third embodiment of the present invention, has none of the duct sections 45a, 45b, 46a, 46b and 46c which cause problems in the conventional adsorption tower 10. As a result, the adsorption tower 13 has a very simple structure and can be made compact as a whole.

The exhaust gas supply duct 98 and the exhaust gas discharge duct 99 can be directly connected to the tower body 20 and, unlike the case shown in FIG. 24, need not be arranged parallel to the tower body 20. Therefore, the construction cost is low and the arrangement space can be small.

Figure 14:
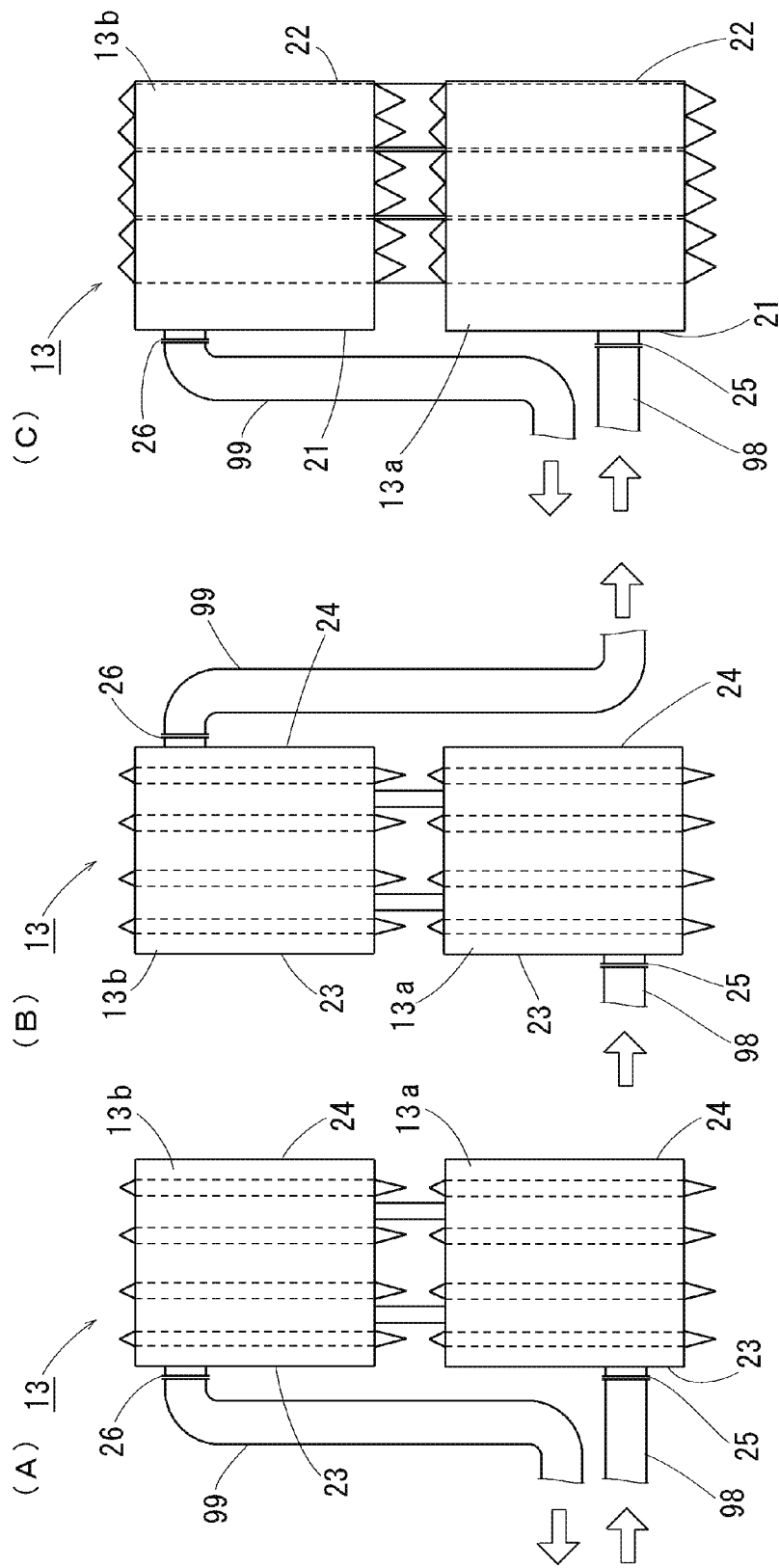
FIG. 14 is an arrangement view of the connection between adsorption tower and ducts and shows three examples (A), (B) and (C).

As shown in the examples (A), (B) and (C) of FIG. 14, the exhaust gas supply duct 98 and the exhaust gas discharge duct 99 can be connected to the adsorption tower 13 in various modes. Accordingly, there is less restriction as to the arrangement of the adsorption tower 13, and the building site can be utilized effectively.

In the conventional adsorption tower 10 shown in FIGS. 20 to 22, the inside of the adsorption tower 10 is divided into five portions by four reaction chambers 51 to 54. That is, there are five spaces therein. In contrast, the first adsorption tower 13a of the present invention is constituted only by the space through which an untreated exhaust gas passes and the two closed spaces 61 and 62, and the second adsorption tower 13b is constituted only by the space through which a treated exhaust gas passes and the two closed spaces 61 and 62. Accordingly, the operations such as inside inspection, maintenance, cleaning and the like can be simplified, leading to higher economy.

In the above description of the adsorption tower of the third embodiment, a case of the adsorption tower having a plurality of closed spaces was described. However, the closed spaces may be single. Further, the number of connecting ducts need not be identical with the number of closed spaces. For example, ducts of any desired number may be combined and the number of total ducts may be made smaller.

Adsorption Tower of Fourth Embodiment

Figure 15:
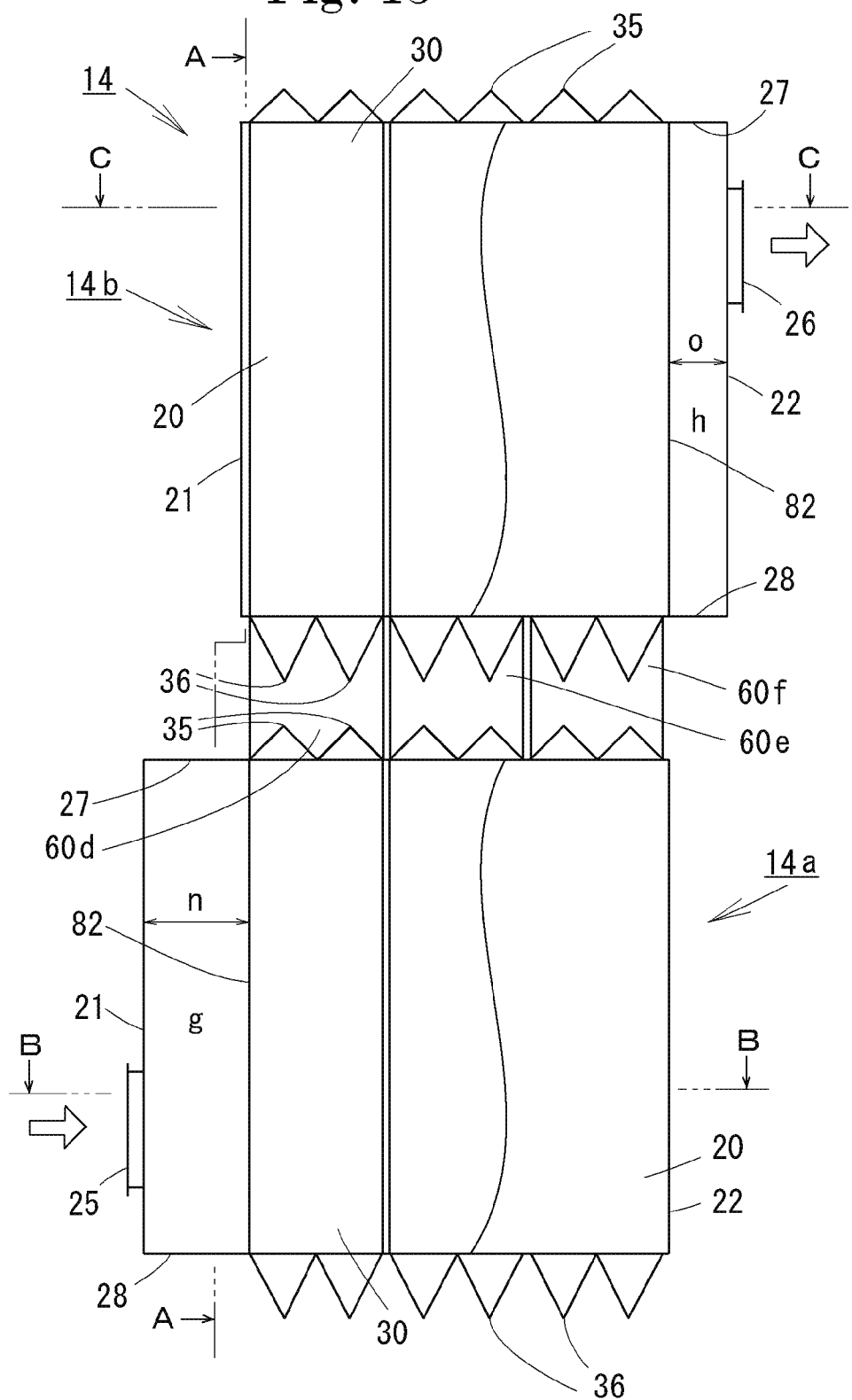
FIG. 15 is a schematic side view showing an example of the fourth embodiment of the adsorption tower of the present invention.
Figure 16:
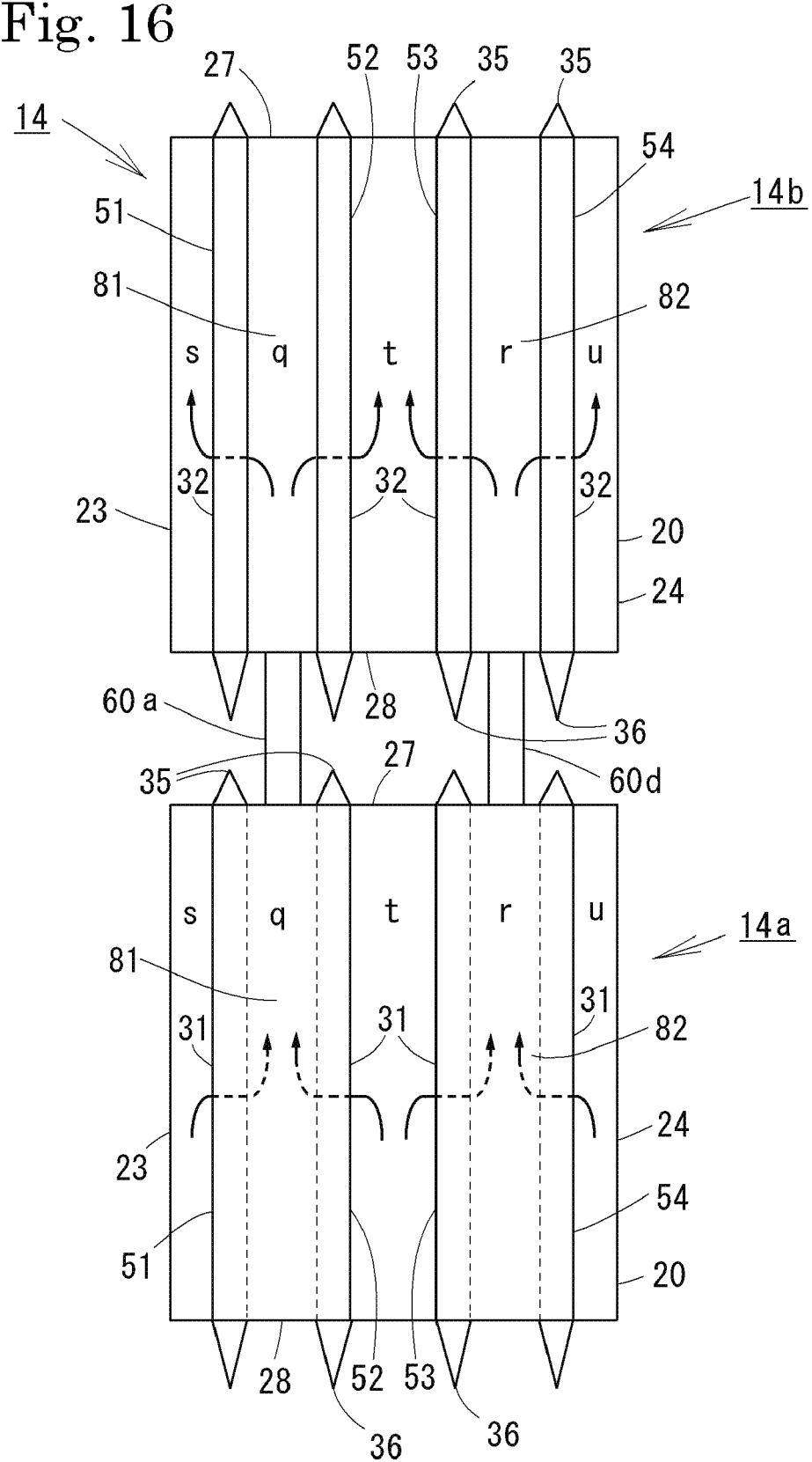
FIG. 16 is a schematic vertical sectional view taken at the A-A line of FIG. 15.
Figure 17:
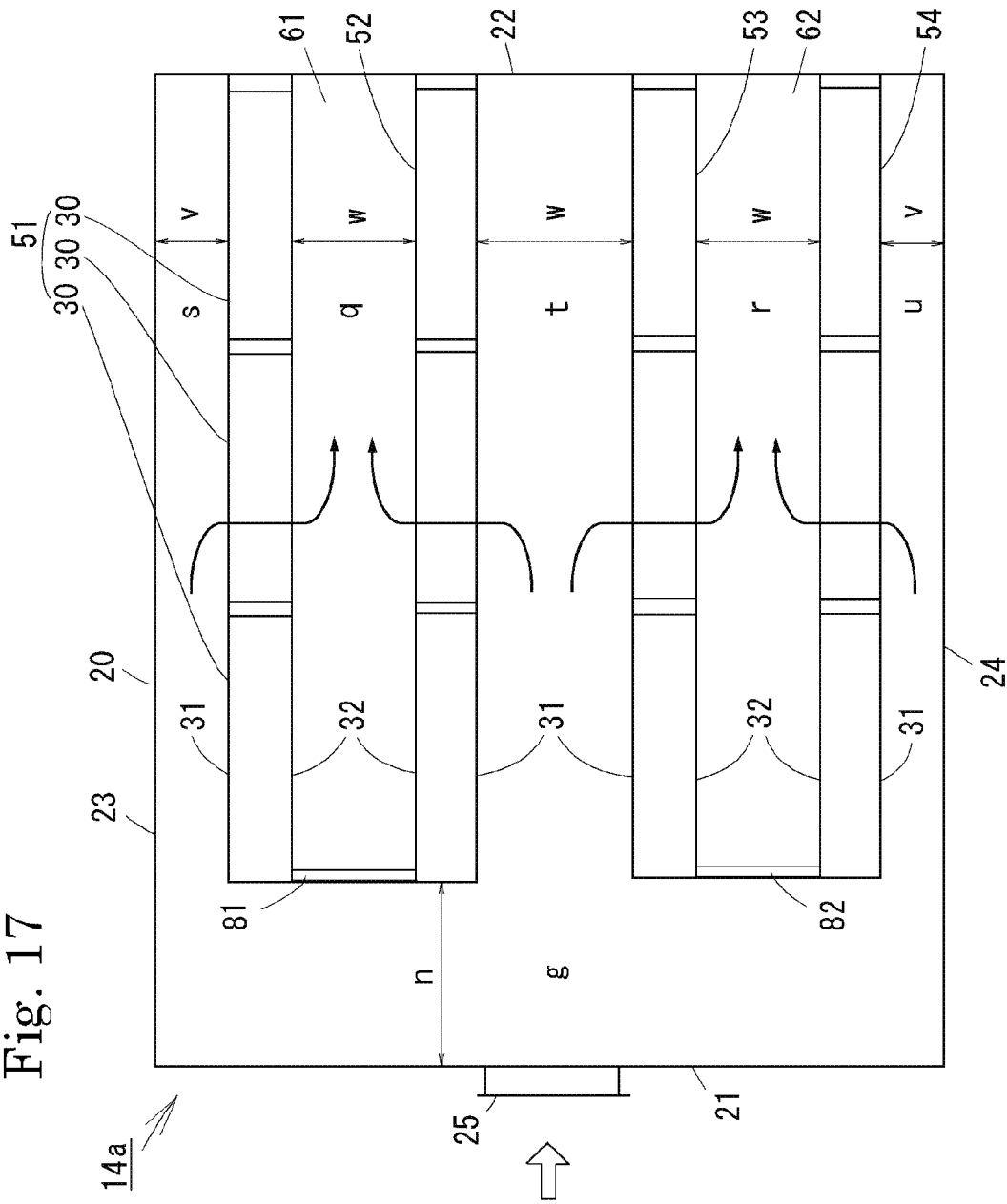
FIG. 17 is a schematic vertical sectional view taken at the B-B line of FIG. 15.
Figure 18:
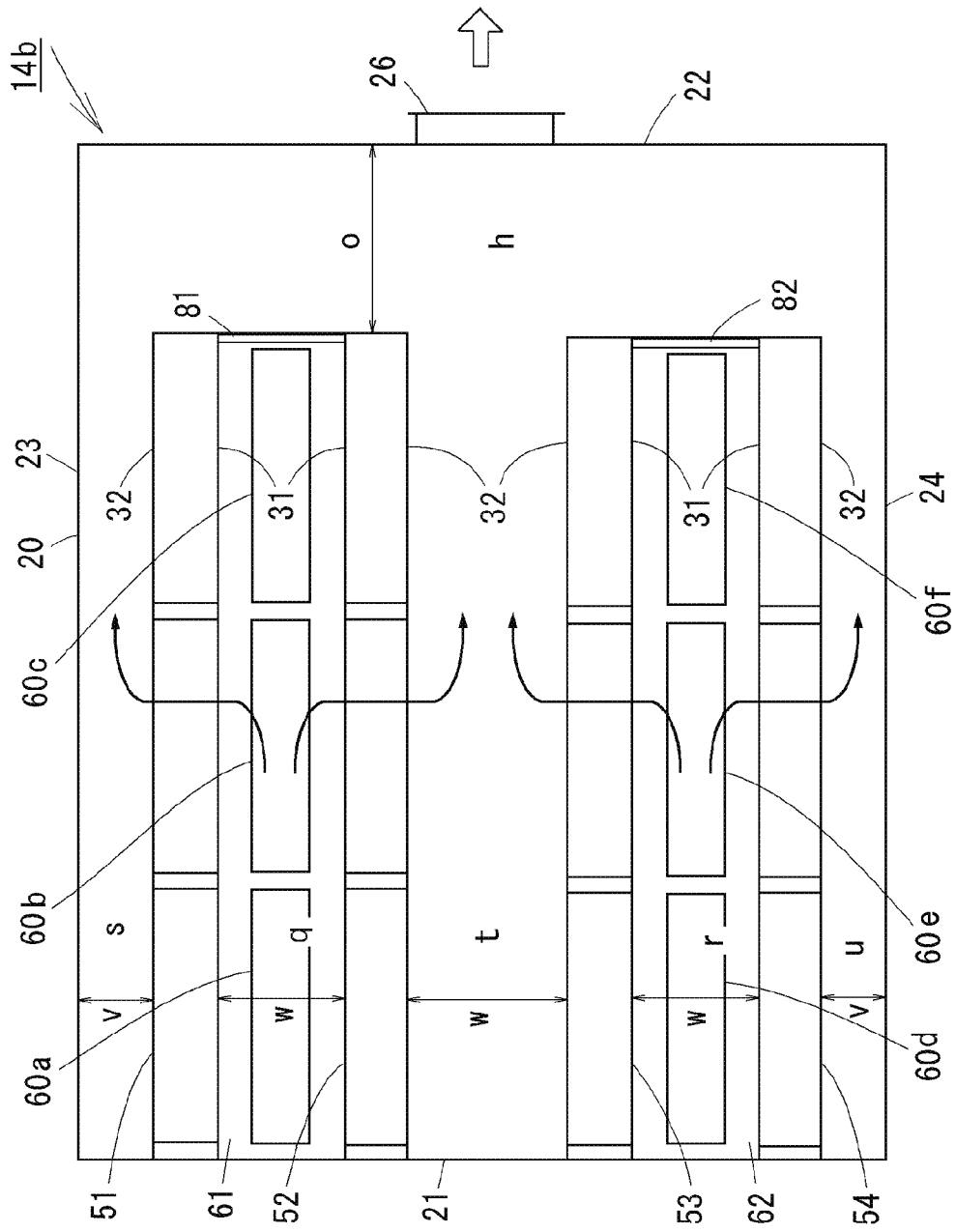
FIG. 18 is a schematic vertical sectional view taken at the C-C line of FIG. 15.

FIG. 15 shows a schematic side view of an adsorption tower 14 which is the fourth embodiment; FIG. 16 shows a schematic sectional view taken at the A-A line of FIG. 15; FIG. 17 shows a schematic sectional view taken at the B-B line of FIG. 15; and FIG. 18 shows a schematic sectional view taken at the C-C line of FIG. 15.

The adsorption tower 14 comprises, as shown in FIG. 15, a first adsorption tower 14a and a second adsorption tower 14b arranged above the first adsorption tower 14a.

As shown in FIG. 16, the first adsorption tower 14a has a boxed-shaped tower body 20 and a plurality of reaction chambers 51, 52, 53 and 54 vertically formed inside the tower body 20 from a tower top wall 27 to a tower bottom wall 28. As shown in FIG. 17, the plurality of reaction chambers 51 to 54 are vertically formed nearly parallel from a front tower wall side toward a rear tower wall 22 while being separated from the front tower wall 21 by a predetermined distance n, and have moving beds therein.

In the first adsorption tower 14a, the distance n is taken between the front tower wall 21 and the ends of reaction chambers, whereby a wind box space g of exhaust gas inlet side is formed.

The reaction chambers 51 to 54 are each constituted by three units 30, 30 and 30. Each unit 30 has the same structure as shown in FIG. 23. The reaction chambers 51 to 54 are each formed in a box shape, as shown in FIG. 23. At each two sides of the reaction chambers, facing each other are formed a gas-incoming surface 31 and a gas-discharging surface 32. A gas passes through these surfaces (these surfaces form a gas-flowing section). At the top of the gas-flowing section 38 is formed a supply section 37 equipped with an adsorbent supply port 35. At the bottom of the gas-flowing section 38 is formed a discharge section 39 equipped with an adsorbent discharge port 36.

In each of the reaction chambers 51 to 54, three units 30 are connected. Two sides of the three units 30, facing each other in a direction intersecting at right angles with the unit-connecting direction are a gas-incoming surface 31 and a gas-discharging surface 32. The interfaces between each two adjacent units 30 and the gaps between the unit 30 and the rear tower wall 22 are closed completely to prevent the passage of exhaust gas.

In the ends of the reaction chambers at the front tower wall 21 side, the openings between each two facing reaction chambers are closed alternately by vertical partition plates 81 and 82. Inside the tower body 20 (the first adsorption tower 14a) is formed a closed space 61 by the two reaction chambers 51 and 52, the rear tower wall 22 and the vertical partition plate 81, and a closed space 62 is formed by the two reaction chambers 53 and 54, the rear tower wall 22 and the vertical partition plate 82.

Thereby, the tower body 20 inside is divided into a space including the inlet side wind box space g, through which an untreated exhaust gas passes, and spaces comprising the closed spaces 61 and 62, through which an exhaust gas after first-stage treatment passes.

The reaction chambers 51 and 52 forming the closed space 61 are arranged so that the respective gas-discharging surfaces 32 face each other, and the space q between them communicate with the insides of connecting ducts 60a, 60b and 60c connected to the second adsorption tower 14b. Similarly, the reaction chambers 53 and 54 forming the closed space 62 are arranged so that the respective gas-discharging surfaces 32 face each other, and the space r between them communicate with the insides of connecting ducts 60d, 60e and 60f.

The space s between the reaction chamber 51 and the side tower wall 23 communicates with an exhaust gas supply port 25 via the inlet side wind box space g. The space t between the reaction chamber 52 and the reaction chamber 53 communicates with the exhaust gas supply port 25 via the inlet side wind box space g. The space u between the reaction chamber 54 and the side tower wall 24 communicates with the exhaust gas supply port 25 via the inlet side wind box space e.

The exhaust gas supply port 25 can be fitted to any of the front tower wall 21, the side tower walls 23 and 24, the tower top wall 27 and the tower bottom wall 28 as long as the exhaust gas supply port 25 faces the inlet side wind box space g. Therefore, the exhaust gas supply port 25 can be fitted at a position at which an exhaust gas supply duct 98 can be conveniently connected to the exhaust gas supply port 25.

The distance n between the front tower wall 21 and the reaction chamber ends, the distance v between the side tower wall 23 and the reaction chamber 51, the distances w between each two facing reaction chambers of 51 to 54, and the distance v between the reaction chamber 54 and the side tower wall 24 can be determined appropriately in consideration of, for example, the pressure loss in the flow of exhaust gas. When the maintenance of the adsorption tower is considered, the distances are preferably at least the distances through which a person can enter the adsorption tower.

The number of reaction chambers formed in the adsorption tower is at least two and may be an odd number or an even number. The upper limit of the number has no particular restriction but the number of reaction chambers is ordinarily 8 or smaller. The vertical partition plates 81 and 82 are installed in order to close the openings between the ends of two facing reaction chambers. As necessary, vertical partition plates are installed in order to close the openings between the reaction chamber ends of front tower wall side and the tower inner wall.

As shown in FIG. 16, the second adsorption tower 14*b* has a boxed-shaped tower body 20 and a plurality of reaction chambers 51, 52, 53 and 54 vertically formed inside the tower body 20 from a tower top wall 27 to a tower bottom wall 28. As shown in FIG. 18, the plurality of reaction chambers 51 to 54 are vertically formed nearly parallel from a front tower wall 21 toward a rear tower wall side while being separated from the rear tower wall 22 by a predetermined distance o, and have moving beds therein.

In the second adsorption tower 14*b*, the distance o is formed between the rear tower wall 22 and the ends of reaction chambers, whereby a wind box space h of exhaust gas outlet side is formed.

The reaction chambers 51 to 54 are each constituted by three units 30, 30 and 30. Each unit 30 has the same structure as shown in FIG. 23. The reaction chambers 51 to 54 are each formed in a box shape, as shown in FIG. 23. Each two sides of the reaction chambers 51 to 54, facing each other are a gas-incoming surface 31 and a gas-discharging surface 32. A gas passes through these surfaces and passes through a gas-flowing section 38. At the top of the gas-flowing section 38 is formed a supply section 37 equipped with an adsorbent supply port 35. At the bottom of the gas-flowing section 38 is formed a discharge section 39 equipped with an adsorbent discharge port 36.

In each of the reaction chambers 51 to 54, three units 30 are connected. Two sides of the three units 30, facing each other in a direction intersecting at right angles with the unit-connecting direction are a gas-incoming surface 31 and a gas-discharging surface 32. The interfaces between each two adjacent units 30 and the gaps between the unit 30 and the front tower wall 21 are closed completely to prevent the passage of exhaust gas.

In the ends of the reaction chambers at the rear tower wall 22 side, the openings between each two facing reaction chambers are closed alternately by vertical partition plates 81 and 82. Inside the tower body 20 (the second adsorption tower 14*b*) is formed a closed space 61 by the two reaction chambers 51 and 52, the front tower wall 21 and the vertical partition plate 81. Further, a closed space 62 is formed by the two reaction chambers 53 and 54, the front tower wall 21 and the vertical partition plate 82.

Thereby, the inside of the tower body 20 is divided into spaces comprising the closed spaces 61 and 62, through which an exhaust gas after the first-stage treatment passes, and a space including the outlet side wind box space h, through which an exhaust gas after the second-stage treatment passes.

The reaction chambers 51 and 52 forming the closed space 61 are arranged so that the respective gas-incoming surfaces 31 face each other. The space q formed between them communicates with the connecting ducts 60*a*, 60*b* and 60*c* connected to the first adsorption tower 14*a*. Similarly, the reaction chambers 53 and 54 forming the closed space 62 are arranged so that the respective gas-incoming surfaces 31 face each other. The space r formed between them communicates with the connecting ducts 60*d*, 60*e* and 60*f*.

The space s between the reaction chamber 51 and the side tower wall 23 communicates with the exhaust gas discharge port 26 via the outlet side wind box space h. The space t between the reaction chamber 52 and the reaction chamber 53 communicates with the exhaust gas discharge port 26 via the outlet side wind box space h. The space u between the reaction chamber 54 and the side tower wall 24 communicates with the exhaust gas discharge port 26 via the outlet side wind box space h.

The exhaust gas discharge port 26 can be fitted to any of the rear tower wall 22, the side tower walls 23 and 24, the tower top wall 27 and the tower bottom wall 28 as long as the exhaust gas discharge port 26 faces the outlet side wind box space h. Therefore, the exhaust gas discharge port 26 can be fitted at a position at which the exhaust gas discharge duct 99 can be conveniently connected to the exhaust gas discharge port 26.

The distance o between the rear tower wall 22 and the reaction chamber ends, the distance v between the side tower wall 23 and the reaction chamber 51, the distances w between each two facing reaction chambers of 51 to 54, and the distance v between the reaction chamber 54 and the side tower wall 24 can be determined appropriately in consideration of, for example, the pressure loss in the flow of exhaust gas. When the maintenance of the adsorption tower is considered, the distances are preferably at least the distances through which a person can enter the adsorption tower.

The number of reaction chambers formed in the adsorption tower is at least two and may be an odd number or an even number. The upper limit of the number has no particular restriction but the number of reaction chambers is ordinarily 8 or smaller. The vertical partition plates 81 and 82 are installed in order to close the openings between the ends of two facing reaction chambers; however, as necessary, vertical partition plates may be installed so as to close the openings between the reaction chamber ends at the rear tower wall side and the tower inner wall.

The adsorption tower 14, which is the fourth embodiment of the present invention, is a device which has the first adsorption tower 14*a* and the second adsorption tower 14*b* to conduct a two-stage treatment of exhaust gas. It is preferred that the reaction chambers 51 to 54 of the first adsorption tower 14*a* and the reaction chambers 51 to 54 of the second adsorption tower 14*b* are manufactured in the nearly same plan view and that the respective reaction chambers are arranged so as to pile up.

The exhaust gas after the first-stage treatment in the first adsorption tower 14*a* is sent to the second adsorption tower 14*b* via the connecting ducts 60*a* to 60*f* and is subjected to the second-stage treatment there. With the above-mentioned shape and arrangement of the first adsorption tower 14*a* and the second adsorption tower 14*b*, the connecting ducts 60*a* to 60*f* can each have a simple and small shape.

The adsorbent is used in the second adsorption tower 14*b* and then used in the first adsorption tower 14*a*. Owing to the above-mentioned shape and arrangement of these adsorption towers, the adsorbent discharge port 36 of each unit 30 of the second adsorption tower 14*b* and the adsorbent supply port 35 of each unit 30 of the first adsorption tower 14*a* can be positioned close and can be connected to each other using a short pipe. The adsorbent which is introduced from the supply port 35 of the second adsorption tower 14b is subjected to the second-stage treatment, then and the first-stage treatment, and is discharged from the discharge port 36 of the first adsorption tower 14a.

The adsorption tower 14, which is the fourth embodiment of the present invention, has none of the duct sections 45a, 45b, 46a, 46b and 46c which cause problems in the conventional adsorption tower 10. As a result, the adsorption tower 14 has a very simple structure and can be made compact as a whole.

The exhaust gas supply duct 98 and the exhaust gas discharge duct 99 can be directly connected to the tower body 20 and, unlike the case shown in FIG. 24, need not be arranged parallel to the tower body 20. Therefore, the construction cost is low and the arrangement space can be small.

Figure 19:
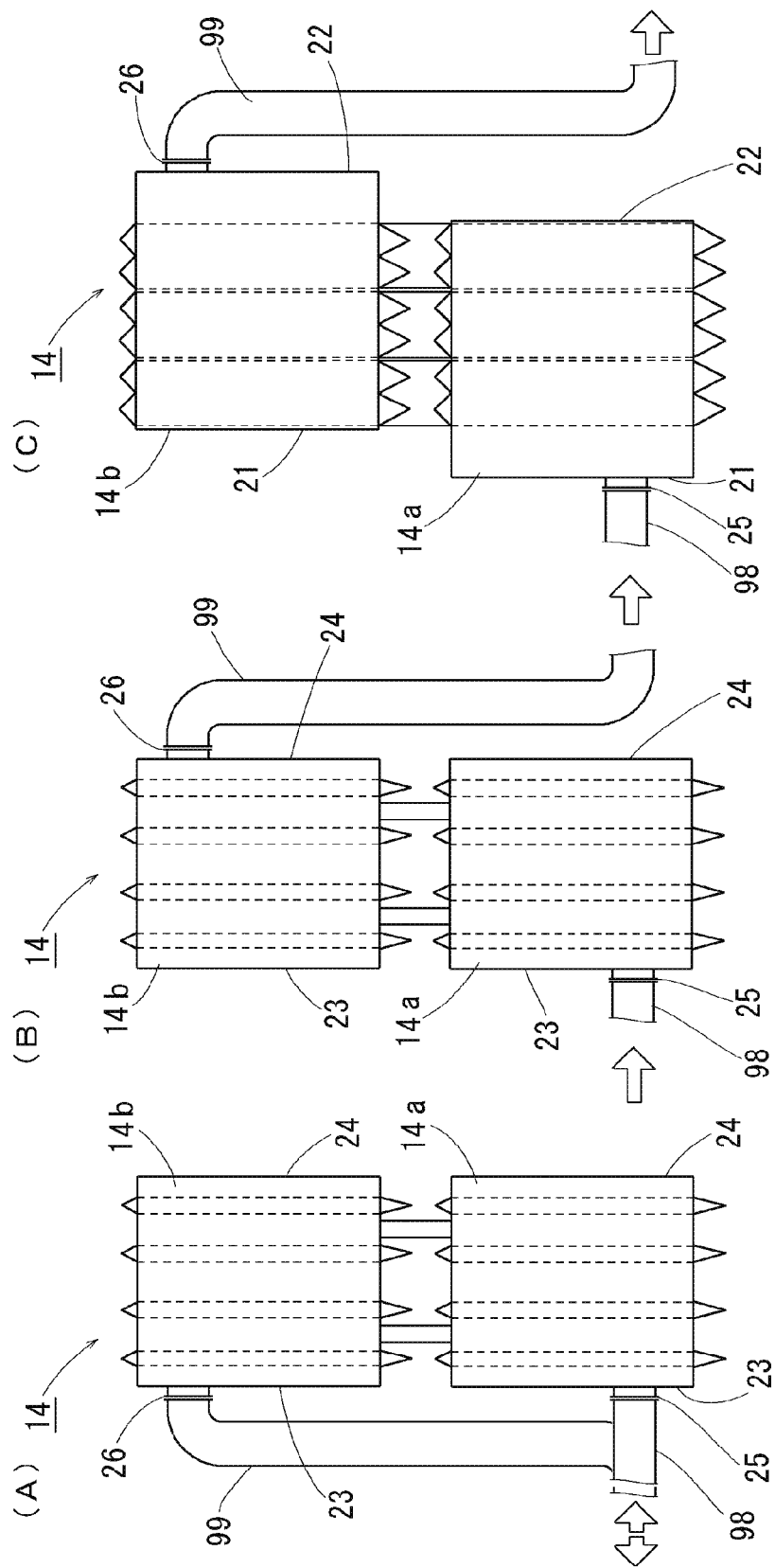
FIG. 19 is an arrangement view of the connection between adsorption tower and ducts and shows three examples (A), (B) and (C).

As shown in the examples (A), (B) and (C) of FIG. 19, the exhaust gas supply duct 98 and the exhaust gas discharge duct 99 can be connected to the adsorption tower 14 in various modes. Accordingly, there is less restriction as to the arrangement of the adsorption tower 14, and the building site can be utilized effectively.

In the conventional adsorption tower 10 shown in FIGS. 20 to 22, the inside of the adsorption tower 10 is divided into five portions by four reaction chambers 51 to 54. That is, there are five spaces therein. In contrast, the first adsorption tower 14a has only the space through which an untreated exhaust gas passes and the two closed spaces 61 and 62, and the second adsorption tower 14b has only the space through which a treated exhaust gas passes and the two closed spaces 61 and 62. Accordingly, the operations such as inside inspection, maintenance, cleaning and the like can be simplified, leading to higher economy.

Incidentally, in the above description of the adsorption tower of the fourth embodiment, a case of the adsorption tower having a plurality of closed spaces was described. However, the closed spaces may be single. Further, the number of connecting ducts need not be identical with the number of closed spaces. For example, ducts of any desired number may be combined and the number of total ducts may be made smaller.

The invention claimed is:

1. An adsorption tower used in an exhaust gas dry treatment device having an adsorption tower for adsorbing and removing the harmful components contained in an exhaust gas, using a granular adsorbent, which adsorbent tower comprises
    a box-shaped tower body,
    a horizontal partition plate of predetermined length formed in the tower body from a front tower wall toward a rear tower wall over the total width of the front tower wall,
    a plurality of reaction chambers which are vertically formed between the horizontal partition plate and the rear tower wall from a tower top wall to a tower bottom wall and which have moving beds therein,
    lower partition plates formed in a lower tower body below the horizontal partition plate so as to alternately close the openings between the ends of reaction chambers and, as necessary, the openings between the ends of reaction chambers and a tower inner wall,
    upper partition plates formed in an upper tower body above the horizontal partition plate so as to alternately close the openings between the ends of reaction chambers and, as necessary, the openings between the ends of reaction chambers and the tower inner wall, wherein no upper partition plate being installed above the lower partition plates and no lower partition plate being installed below the upper partition plates,
    an exhaust gas supply port allowing the inside of an inlet side wind box space which is formed in the tower body below the horizontal partition plate, to communicate with the inside of an exhaust gas supply duct, and
    an exhaust gas discharge port allowing the inside of an outlet side wind box space which is formed in the tower body above the horizontal partition plate, to communicate with the inside of an exhaust gas discharge duct.

2. An adsorption tower used in an exhaust gas dry treatment device having an adsorption tower for adsorbing and removing the harmful components contained in an exhaust gas, using a granular adsorbent, which adsorbent tower comprises a first adsorption tower, a second adsorption tower installed above the first adsorption tower, and connecting ducts connecting the first adsorption tower with the second adsorption tower,
    the first adsorption tower comprising
        a box-shaped tower body,
        a plurality of reaction chambers which are vertically formed in the tower body so as to extend from a front tower wall side toward a rear tower wall facing the front tower wall and from a tower top wall to a tower bottom wall while being separated from the front tower wall by a predetermined distance, and which have moving beds therein,
        vertical partition plates installed so as to alternately close the openings between the ends of each two reaction chambers at the front tower wall side and, as necessary, vertical partition plates installed so as to close the openings between the ends of reaction chambers at the front tower wall side and a tower inner wall, and
        an exhaust gas supply port allowing the inside of an inlet side wind box space formed in the first adsorption tower body between the front tower wall and the vertical partition plates, to communicate with the inside of an exhaust gas supply duct,
    the second adsorption tower comprising
        a box-shaped tower body,
        a plurality of reaction chambers which are vertically formed in the tower body so as to extend from a rear tower wall side toward a front tower wall facing the rear tower wall and from a tower top wall to a tower bottom wall while being separated from the rear tower wall by a predetermined distance, and which have moving beds therein,
        vertical partition plates installed so as to alternately close the openings between the ends of each two facing reaction chambers at the rear tower wall side and, as necessary, vertical partition plates installed so as to close the openings between the ends of reaction chambers at the rear tower wall side and a tower inner wall, and
        an exhaust gas discharge port allowing the inside of an outlet side wind box space formed in the second adsorption tower body between the rear tower wall and the vertical partition plates, to communicate with the inside of an exhaust gas discharge duct,
    and the connecting ducts comprising
        at least one connecting duct allowing the inside of at least one closed space formed in the first adsorption tower body by two facing reaction chambers, the rear tower wall and one vertical partition plate, to communicate with the inside of at least one closed space formed in the second adsorption tower body by two facing reaction chambers, the front tower wall and one vertical partition plate.

3. The adsorption tower according to claim 1, wherein each reaction chamber comprises a plurality of units connected in a series and each unit formed in a box shape, comprises
- a gas-flowing section having a gas-incoming surface and a gas-leaving surface at the two sides facing with each other in a direction intersecting at right angles with the connection direction of units,
- an adsorbent supply section formed above the gas-flowing section, and
- an adsorbent discharge section formed below the gas-flowing section.

4. The adsorption tower according to claim 2, wherein each reaction chamber comprises a plurality of units connected in a series and each unit formed in a box shape, comprises
- a gas-flowing section having a gas-incoming surface and a gas-leaving surface at the two sides facing with each other in a direction intersecting at right angles with the connection direction of units,
- an adsorbent supply section formed above the gas-flowing section, and
- an adsorbent discharge section formed below the gas-flowing section.

* * * * *